United States Patent
Yoon et al.

(10) Patent No.: US 9,256,747 B2
(45) Date of Patent: Feb. 9, 2016

(54) TERMINAL AND METHOD FOR HIDING AND RESTORING MESSAGE

(71) Applicant: Pantech Co., Ltd., Seoul (KR)

(72) Inventors: Ji-Sun Yoon, Seoul (KR); Ui-Jun Park, Seoul (KR); Seung-Hyun Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 202 days.

(21) Appl. No.: 13/758,444

(22) Filed: Feb. 4, 2013

(65) Prior Publication Data

US 2013/0227705 A1 Aug. 29, 2013

(30) Foreign Application Priority Data

Feb. 24, 2012 (KR) ........................ 10-2012-0019288

(51) Int. Cl.
*G06F 3/048* (2013.01)
*G06F 21/60* (2013.01)
*G06F 21/62* (2013.01)
*H04M 1/725* (2006.01)
*G06F 3/0484* (2013.01)

(52) U.S. Cl.
CPC ............ *G06F 21/60* (2013.01); *G06F 21/6245* (2013.01); *G06F 3/04842* (2013.01); *G06F 2221/032* (2013.01); *H04M 1/72552* (2013.01)

(58) Field of Classification Search
CPC ...... H04M 1/72547–1/72586; H04M 1/72597; H04M 2250/22; H04M 2250/60; H04L 1/04–1/36; H04L 51/04–51/046; H04L 12/1813–12/1831; G06F 3/048–3/0486; G06F 2203/04803–2203/04808; G06Q 10/06–10/067; G06Q 50/01
USPC ............................... 715/200–867; 455/1–899
See application file for complete search history.

(56) References Cited

U.S. PATENT DOCUMENTS

| | | | | |
|---|---|---|---|---|
| 5,305,435 | A * | 4/1994 | Bronson | G06F 3/0481 715/775 |
| 6,771,974 | B1 * | 8/2004 | Sim | H04M 1/72552 340/7.21 |
| 8,621,022 | B2 | 12/2013 | Buchheit et al. | |
| 8,751,572 | B1 * | 6/2014 | Behforooz et al. | 709/204 |
| 2005/0149622 | A1 * | 7/2005 | Kirkland | H04L 51/04 709/207 |
| 2007/0005716 | A1 * | 1/2007 | LeVasseur | H04L 63/306 709/206 |
| 2009/0006552 | A1 * | 1/2009 | Tholpadi | H04L 12/583 709/205 |
| 2009/0282360 | A1 * | 11/2009 | Park | G06F 3/0482 715/786 |

(Continued)

FOREIGN PATENT DOCUMENTS

| | | |
|---|---|---|
| JP | 2002-334044 | 11/2002 |
| JP | 2003-162483 | 6/2003 |

(Continued)

*Primary Examiner* — Andrea Long
*Assistant Examiner* — Linda Huynh
(74) *Attorney, Agent, or Firm* — H.C. Park & Associates, PLC

(57) ABSTRACT

A terminal to hide a message includes an input unit to receive a signal to hide a message and a signal to restore a hidden message; a display unit to display the message and the hidden message; and a control unit to control display of the message. The terminal hides messages or applications on a separate screen. The separate screen may be a virtual screen or a different display screen. A hidden message may be displayed on the separate screen according to a conversation partner. A hidden message may be restored to a location in which the message would have originally been displayed. A portion of the stored message may be extracted and provided to an application of the terminal.

17 Claims, 31 Drawing Sheets

(56) References Cited

U.S. PATENT DOCUMENTS

| | | | |
|---|---|---|---|
| 2010/0011317 A1* | 1/2010 | Lee | 715/784 |
| 2010/0017483 A1* | 1/2010 | Estrada | G06Q 10/107 709/206 |
| 2010/0125801 A1* | 5/2010 | Shin | G06F 1/1616 715/758 |
| 2010/0273454 A1* | 10/2010 | Lee | G06Q 10/107 455/412.1 |
| 2012/0054674 A1* | 3/2012 | Beykpour | G06F 3/0481 715/788 |
| 2012/0131519 A1* | 5/2012 | Jitkoff | G06F 3/0481 715/863 |
| 2012/0165075 A1* | 6/2012 | Kim | G06F 9/4443 455/566 |
| 2012/0304074 A1* | 11/2012 | Ooi | G06F 3/04895 715/752 |

FOREIGN PATENT DOCUMENTS

| | | |
|---|---|---|
| JP | 2007-042137 | 2/2007 |
| JP | 2009-267948 | 11/2009 |
| KR | 10-2005-0009386 | 1/2005 |
| KR | 10-2005-0028761 | 3/2005 |
| KR | 10-0541760 | 4/2005 |
| KR | 10-2005-0053292 | 6/2005 |
| KR | 10-2006-0098674 | 9/2006 |
| KR | 10-0695912 | 2/2007 |
| KR | 10-2007-0037476 | 4/2007 |
| KR | 10-2007-0050314 | 5/2007 |
| KR | 10-2010-0061351 | 6/2010 |
| KR | 10-2011-0010236 | 2/2011 |
| KR | 10-2011-0096090 | 8/2011 |
| WO | 01-95558 | 12/2001 |

* cited by examiner

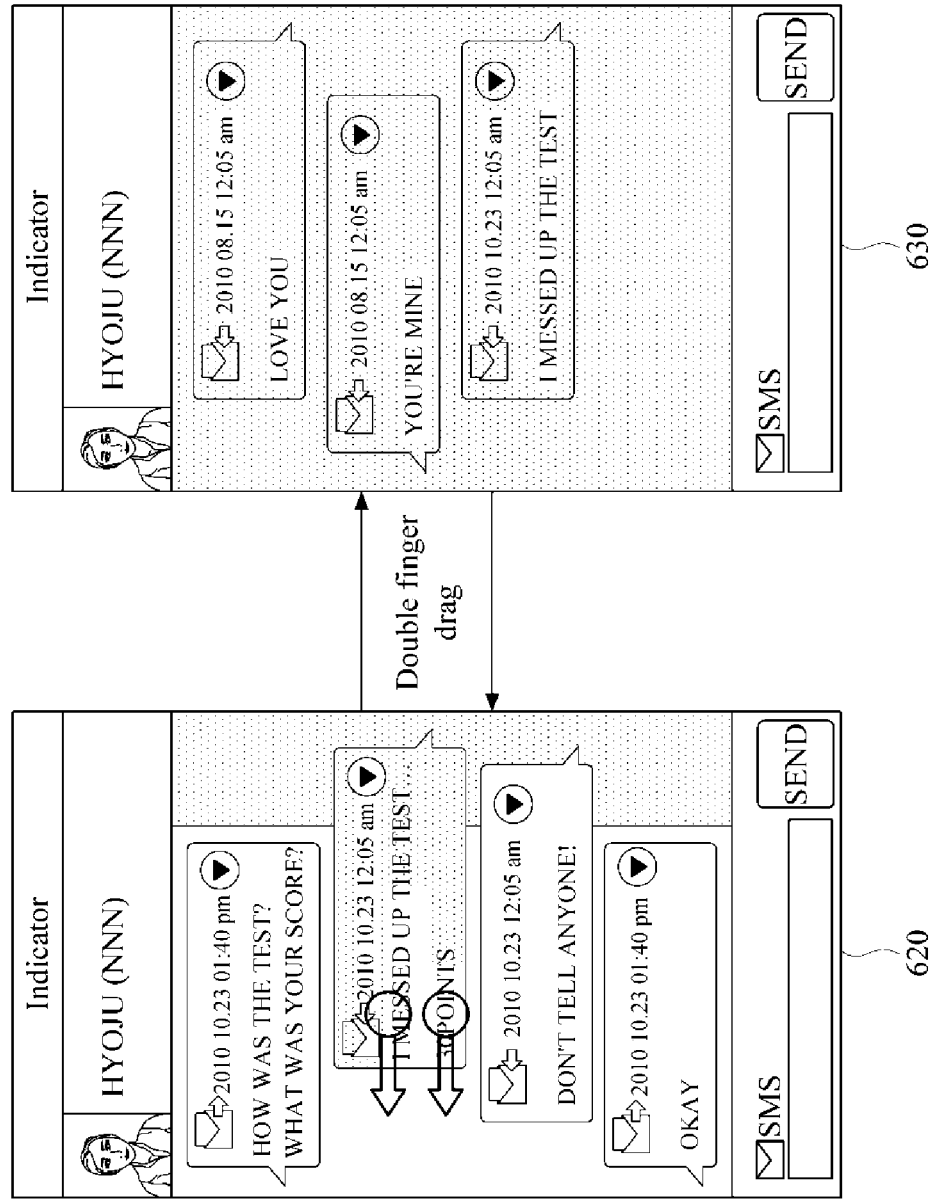

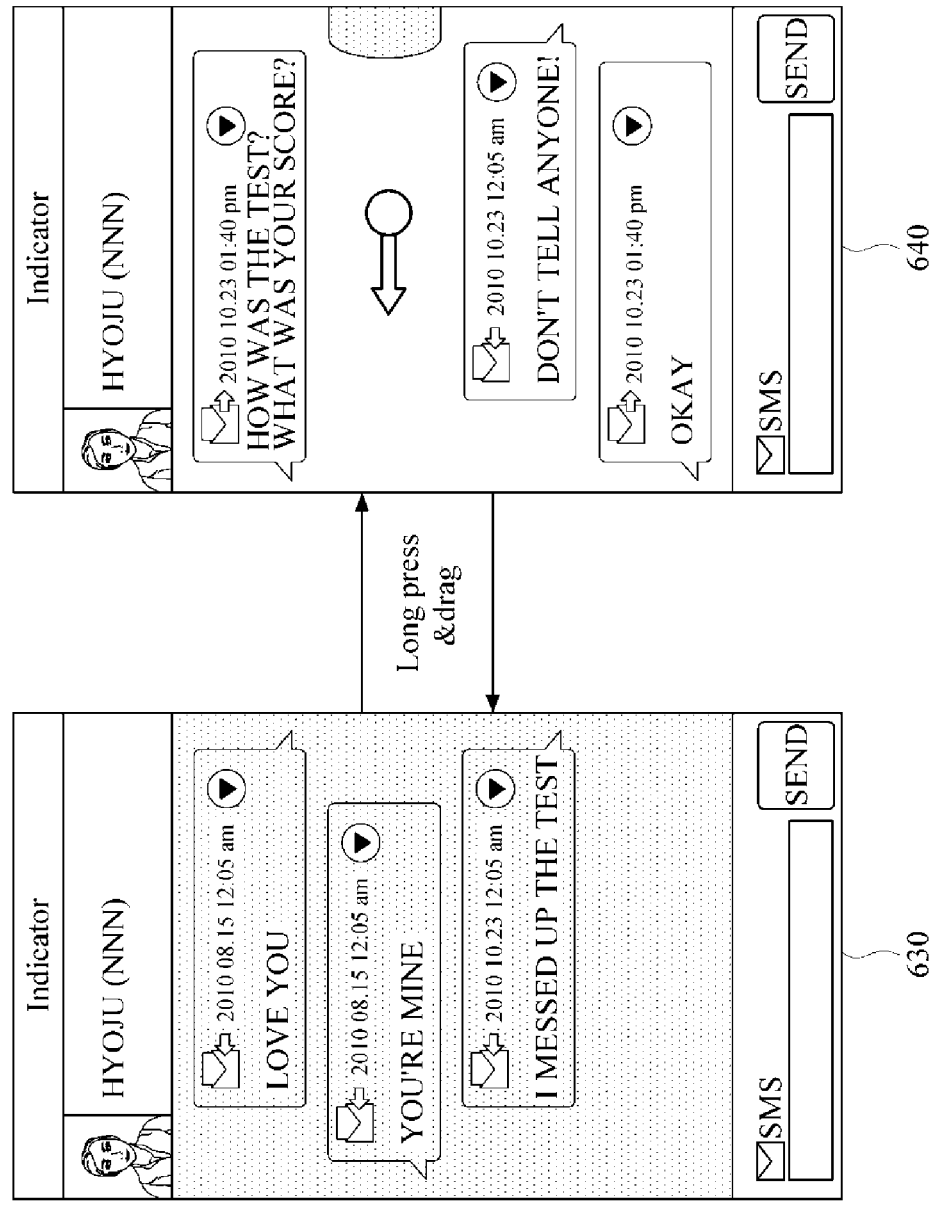

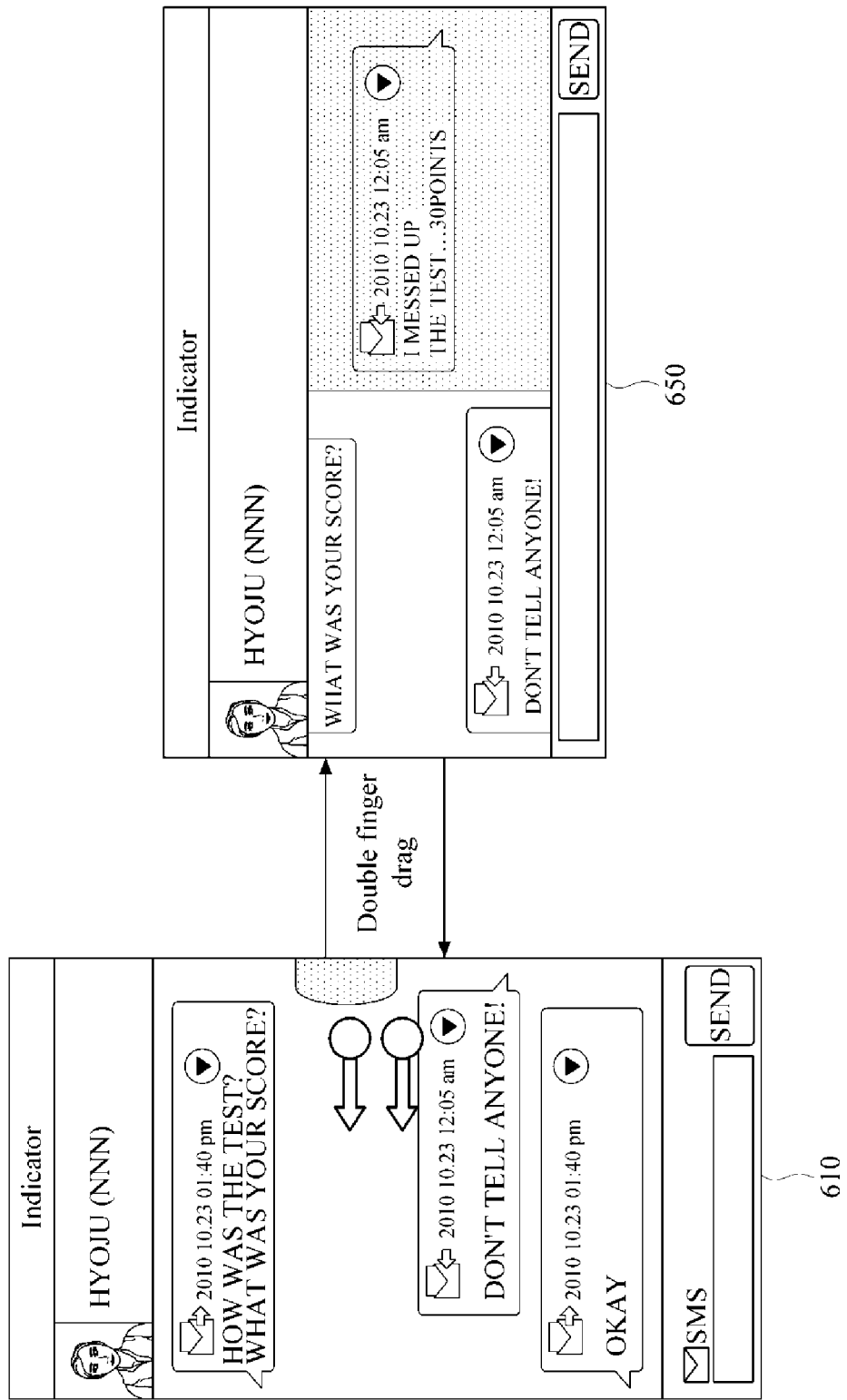

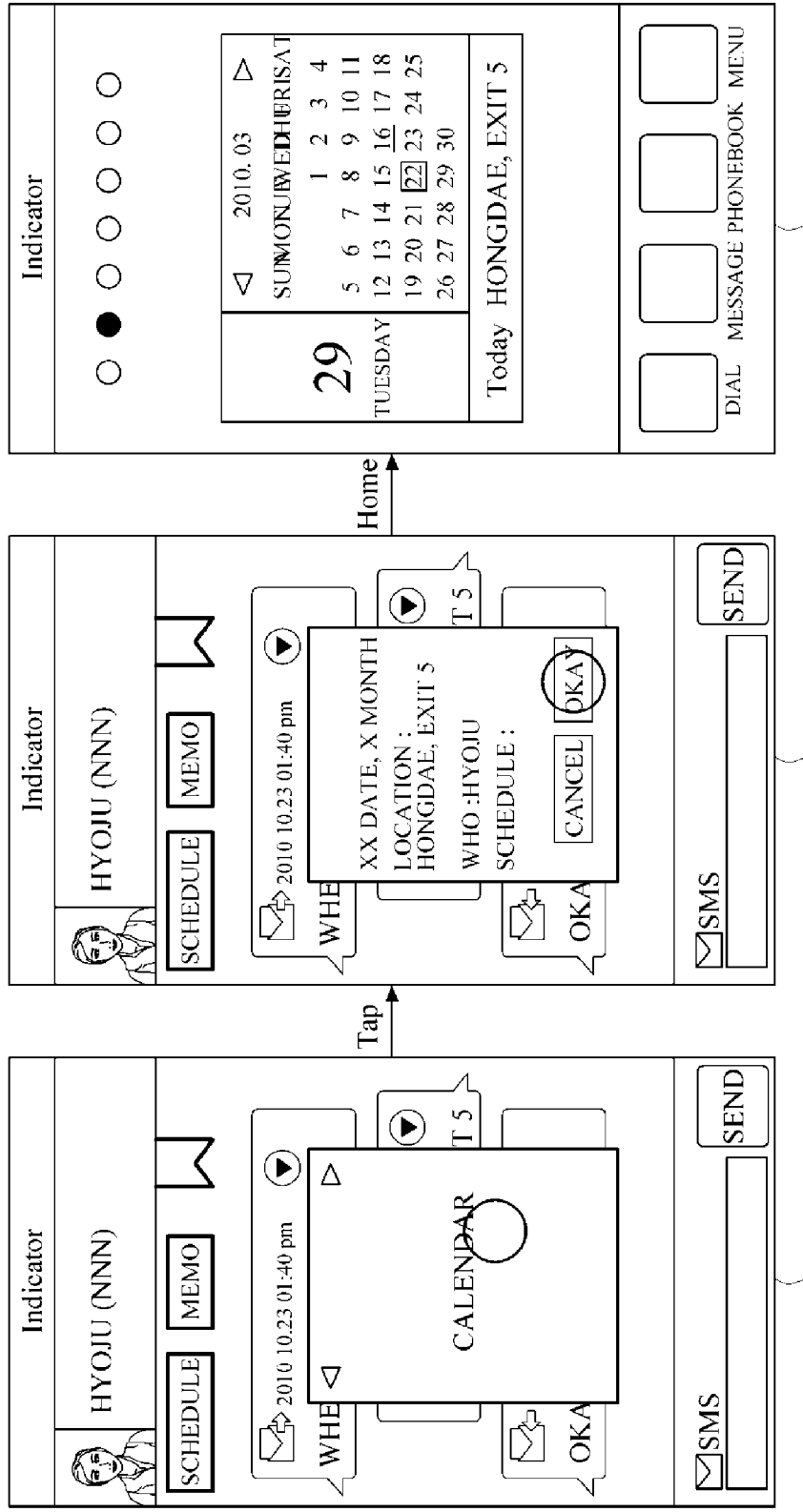

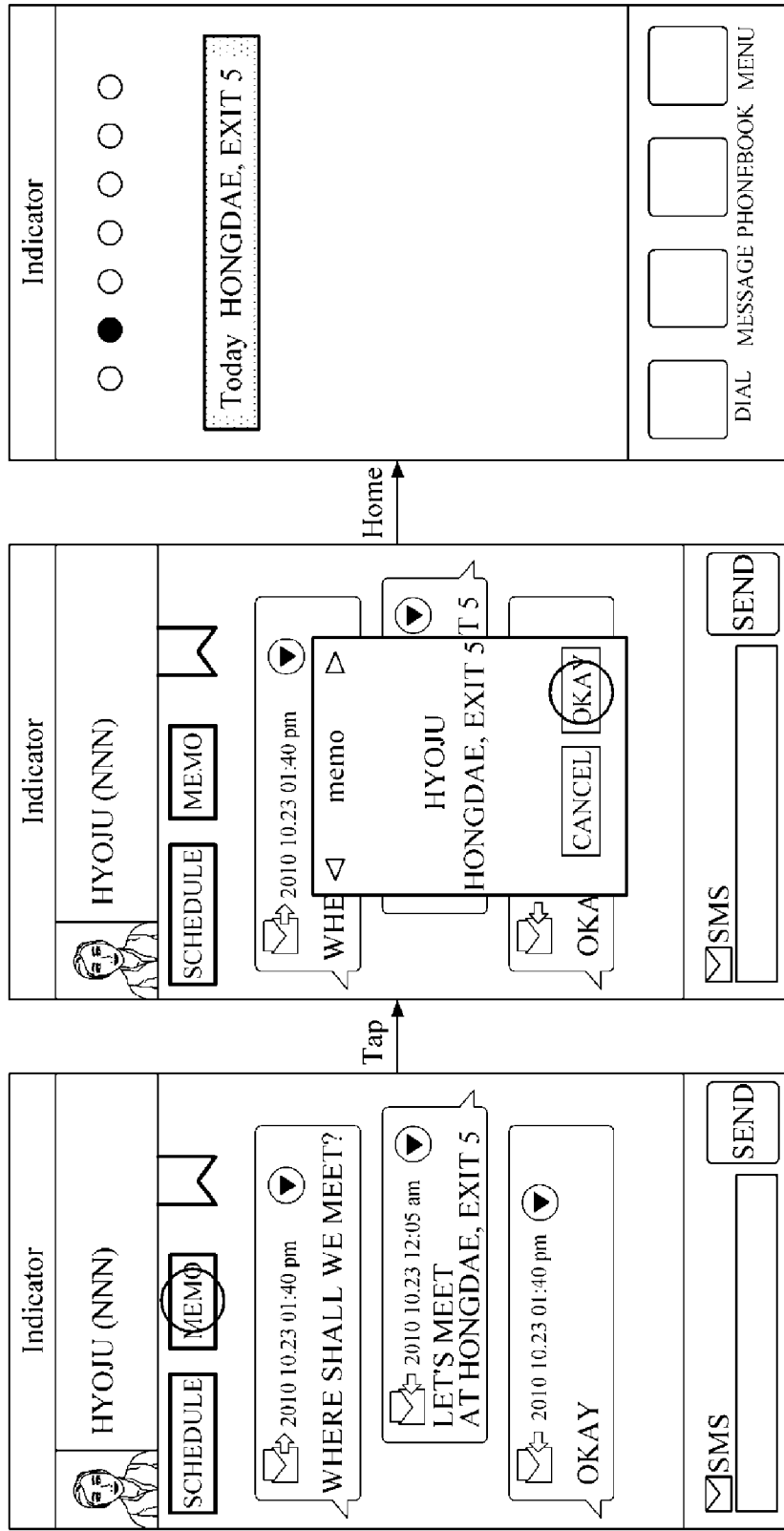

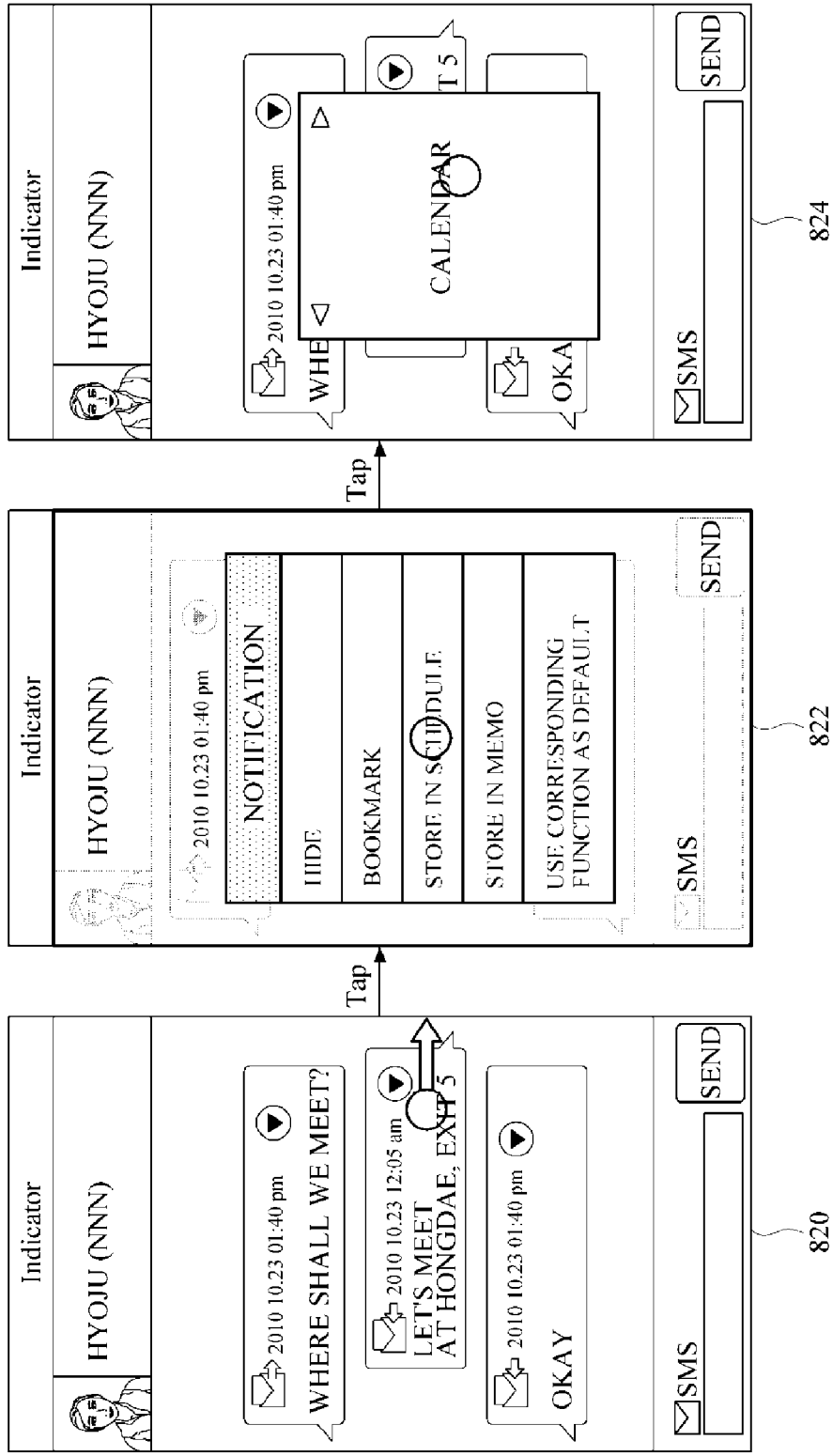

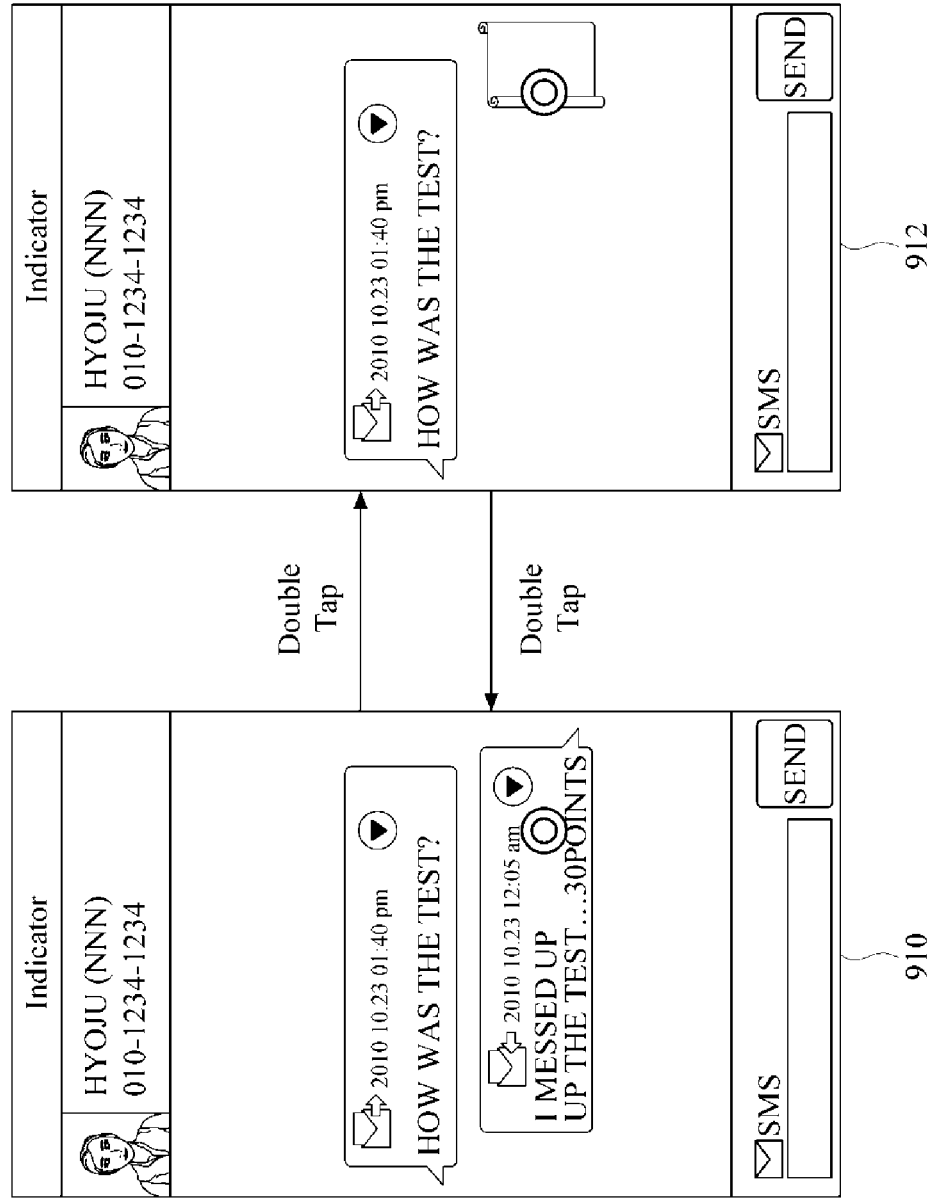

TERMINAL AND METHOD FOR HIDING AND RESTORING MESSAGE

CROSS-REFERENCE TO RELATED APPLICATION

This application claims priority from and the benefit under 35 U.S.C. §119(a) of Korean Patent Application No. 10-2012-0019288, filed on Feb. 24, 2012, the entire disclosure of which is incorporated herein by reference for all purposes.

BACKGROUND

1. Field

The following description relates to data protection technology, and more particularly, to message hiding and message restoring technology.

2. Discussion of the Background

Developments in the information and communications industry have increased the number of methods of acquiring information available to users. Devices like mobile terminals have become essential communication devices and are used particularly for transmitting messages and receiving messages.

Increasing device usability is accompanied by increasing interest in data protection, which requires a user environment that is highly usable and more intuitive. That is, increasing usability is accompanied by an increasing need for a user environment that is highly convenient and intuitive when displaying messages or managing message lists or messages.

As an example of a message display and management method, if a user wishes to perform an archiving process on a specific message from an outgoing/incoming message list (a first message list) for consolidated management of messages transmitted to and received from a large number of partners, the specific message may be moved from the first message list to a message archiving list (a second message list) to be stored, and eliminated from the first message list.

For example, if the specific message to be archived is selected by the user from the first message list through a hardware button or a software button, a menu screen may pop up, and then the message is eliminated from the first message list if an archiving instruction is input by the user.

Accordingly, it may be difficult for the user to intuitively discern which message is eliminated from the first message list, or where the message is located in the second message list.

In addition, since the archived messages are all stored in a storage box in a list form without distinction between conversation partners, a series of processes of selecting individual messages from the list of the storage box, verifying detailed contents of a message to be retrieved by the user, transmission/reception targets, or the date and time of transmission/reception, and returning to the list have to be repeatedly performed in order to view the detailed contents, the transmission/reception targets, or the date and time of transmission/reception. This repetition may be the result of messages being stored in the message storage box which is integrally managed without distinction between transmission/reception targets, the data, and time of transmission/reception, and the like, if the messages are separately archived.

In addition, when a user wishes to view previously received messages, a considerable amount of time may be required for searching if there is a large history of messages.

SUMMARY

Exemplary embodiments of the present invention provide a terminal having a data protection operation and a message hiding operation.

Exemplary embodiments of the present invention provide a method for message hiding and restoring.

Additional features of the invention will be set forth in the description which follows, and in part will be apparent from the description, or may be learned by practice of the invention An exemplary embodiment of the present invention discloses a terminal to hide a message, including: an input unit to receive a first input signal and a second input signal; a control unit to hide a message in response to the first input signal and to restore the message in response to the second input signal; and a display unit to display messages according to control of the control unit.

An exemplary embodiment of the present invention also discloses a method for hiding a message, including: receiving a first input to select a message on a main screen; moving the message to a hidden screen in response to the first input; and restoring the message to the main screen if a second input is received.

An exemplary embodiment of the present invention also discloses a method for hiding an application, including: receiving a first input to select an application on a main screen; moving the application to a hidden screen in response to the first input; and restoring the application to the main screen if a second input is received.

An exemplary embodiment of the present invention also discloses a method of hiding and restoring an object, including: receiving an input selecting an object; and hiding or restoring the selected object in response to the input.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7C is a diagram of a screen to hide a message or to restore the hidden message according to an exemplary embodiment of the present invention.

FIG. 7D is a diagram of a screen to hide a message or to restore the hidden message according to an exemplary embodiment of the present invention.

FIG. 7E is a diagram of a screen to hide a message or to restore the hidden message according to an exemplary embodiment of the present invention.

FIG. 8C is a diagram of a screen of a message hiding operation according to an exemplary embodiment of the present invention.

FIG. 8D is a diagram of a screen of a message hiding operation according to an exemplary embodiment of the present invention.

FIG. 9B is a diagram of a screen of a message hiding operation according to an exemplary embodiment of the present invention.

FIG. 10B is a diagram of a screen to hide a message or restore a hidden message according to an exemplary embodiment of the present invention.

DETAILED DESCRIPTION OF THE ILLUSTRATED EMBODIMENTS

Figure 1:
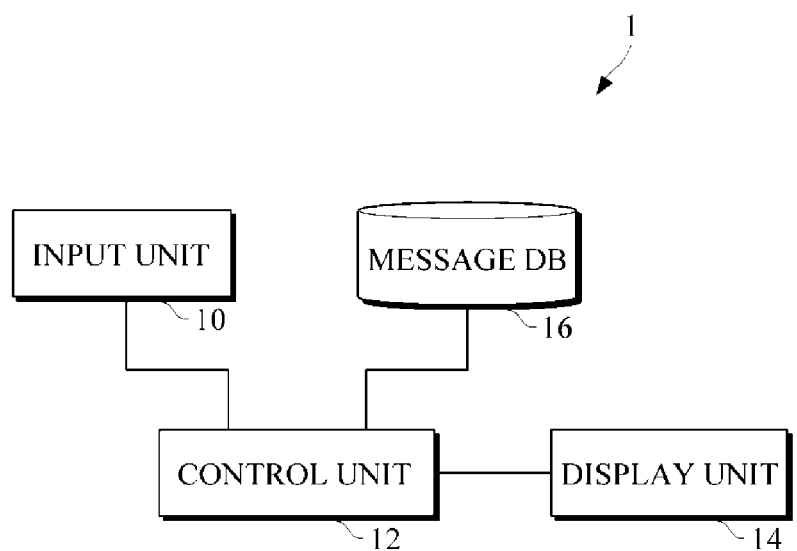
FIG. 1 is a diagram of a terminal according to an exemplary embodiment of the present invention.

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" another element or layer, it can be directly on the other element or layer, or intervening elements or layers may be present. In contrast, when an element is referred to as being "directly on" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a diagram of a terminal according to an exemplary embodiment of the present invention.

A terminal 1 includes an input unit 10, a control unit 12, and a display unit 14. The terminal 1 may further include a message database 16.

The terminal 1 may be any device which can transmit messages to and receive messages from another party in a wired or wireless manner, such as cellular phones, personal digital assistants (PDAs), wireless communication devices, portable devices, laptop computers, tablet computers, desktop computer, cordless phones, and the like. The terminal 1 may be a portable multi-functional device, such as a smart phone, a smart pad, and the like. The terminal 1 may include a user interface to recognize a touch operation input from a user.

Privacy of a terminal user may be protected by enabling a message to be hidden if the user opens a message window to read or edit the message. The message refers to a message which the user does not want to reveal or wants to archive separately. The message may be a reference message, a predetermined message, a selected message, and the like.

Ease of use may be increased in addition to protecting privacy. A hiding operation may be performed on a message, and the message may be hidden within the message window through a user's simple operation. If hiding the message, an original position may be hidden to be identified. Accordingly, a user may verify in which position the message is hidden within the message window.

Messages may be hidden or archived for each conversation partner, and therefore the user may immediately verify which conversation partners' messages are hidden within the message window.

A hide target is not limited to messages, and the hide target may be replaced with or expanded to all types of data which the user can hide in the terminal 1 for information protection. For example, the hide target may be phonebook data, call list data, schedule data, or memo data. The messages may include character messages, multimedia messages, or multimedia contents. The multimedia messages may be character messages including photos, moving images, music, and the like. The multimedia message may be, for example, image data or moving image data.

The message hiding operation may be applied to message-related applications such as Kakao Talk, and the like, in addition to general message programs.

The display unit 14 may display a message on a screen. The message may be displayed in the form of a speech bubble for each conversation partner. The speech bubble may be a graphic user interface object in which contents of the message transmitted to and received from a corresponding conversation partner within a small box may be recorded. For example, on the screen of the terminal 1, messages transmitted and received between a user and a conversation partner A may be displayed in chronological order. Messages transmitted to the conversation partner A from the user may be displayed on the right side of the screen, and on the left side of the screen, messages received by the user from the conversation partner A may be displayed.

The message displayed in the form of a speech bubble for each conversation partner will be described in detail with reference to the appended drawings.

The display unit 14 may display, on the screen of the terminal 1, at least a part of a main screen where an outgoing message and an incoming message may be displayed, an outgoing hide screen where an outgoing message is hidden, an incoming hide screen where an incoming message is hidden, and an outgoing/incoming hide screen where the hidden outgoing message and the hidden incoming message are all displayed.

The input unit 10 may be a user interface for executing user commands such as message reading, deletion, editing, hiding, archiving, and the like, with respect to the message displayed on the screen through the display unit 14.

The input unit 10 may receive a user input signal to hide the message displayed on the screen or to restore a hidden message. The input unit 10 may recognize a touch operation of the user. The input unit 10 and the display unit 14 may be formed in the same physical space, for example, in a touch-screen, so that the user may perform the touch operation on the screen. The user input signal for hiding the message may be received according to a drag method, a double-tap method, a rubbing method, etc. with respect to the message. A drag method, a double-tap method, and a rubbing method will be described below with reference to FIG. 10A, FIG. 10B, and FIG. 10C.

The user input may include a gesture recognition method, a motion recognition method, and the like.

The input unit 10 may receive the user input signal in a direction perpendicular to a direction aligned with scroll direction of a message.

The user input signal may be received via a touch and drag method, a flicking method, or the like. The user input signal may be received in a position of a hide target message in the message list if hiding the message, and in an empty space where the message is absent from the message list or in a message position where a hiding indicator is present if restoring the message.

The control unit 12 may control the display unit 14 in accordance with the user input signal received from the input unit 10 to hide the message in a screen space or restore the message hidden in the screen space. The control unit 12 may hide the message in the screen space corresponding to an original position of the hidden message to identify an origin of the hidden message.

If the message is provided in the form of a speech bubble for each conversation partner, the control unit 12 may perform a message hiding and restoring operation for each conversation partner.

For example, message hiding may refer to the control unit 12 displaying an outgoing hide screen and displaying an incoming hide screen on the other side. The outgoing hide screen may be disposed on a side perpendicular to a direction in which the messages are aligned in a row on the main screen. In other words, the outgoing hide screen may be disposed to be perpendicular to a direction in which the messages are parallel with each other. The messages may be hidden in the screen space horizontally corresponding to the original position of the hidden message. The outgoing hidden screen and incoming hidden screen will be described below with reference to FIG. 3, FIG. 4, and FIG. 5.

For example, message hiding may refer to the control unit 12 displaying the outgoing hide screen and the incoming hide screen through a virtual view separately from a view of the main screen by controlling the display unit 12. The messages are hidden in the screen space horizontally and vertically corresponding to the original position of the hidden message. A virtual outgoing hide screen and incoming hide screen will be described below with reference to FIG. 6.

The message database ("DB") 16 may manage the hidden messages. The message DB 16 may be utilized as a space for storing and managing the hidden messages. Messages restored by the user after being hidden may be eliminated from the message DB 16.

The control unit 12 may provide an addition operation in conjunction with another application with respect to the hidden message. The applications may be schedules, notes, or bookmarks. An example of the additional operation in conjunction with the other application will be described below with reference to FIG. 8A, FIG. 8B, FIG. 8C, FIG. 8D, FIG. 8E and FIG. 8F.

Figure 2:
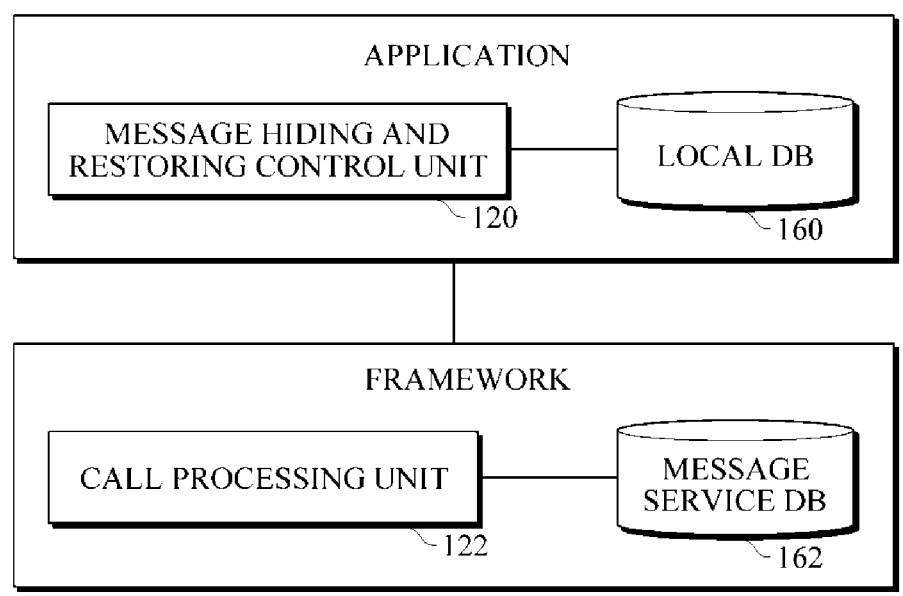
FIG. 2 is a diagram of a control unit and a message DB according to an exemplary embodiment of the present invention.

FIG. 2 is a diagram of a control unit and a message DB according to an exemplary embodiment of the present invention.

The components of the terminal 1 shown in FIG. 2 may be logically separated, however two or more of these components may be physically integrated or they may all be separately implemented. Although FIG. 2 will be described with reference to the features of FIG. 1, exemplary embodiments are not limited thereto.

The control unit 12 includes a message hiding and restoring control unit 120 (hereinafter, referred to as "a message control unit") of an application terminal, and a call processing unit 122 of a framework terminal. The message DB 16 includes a local DB 160 of the application terminal and a message service DB 162 of the framework terminal.

A DB that stores messages such as multimedia message service (MMS), message service (SMS), and the like may not be the local DB 160 depending on the application but rather the message service DB 162 managed by the call processing unit 122 of the framework terminal.

The application may perform an arithmetic operation with respect to the message service DB 162 through the call processing unit 122. There may be a risk if directly changing a structure of the call processing unit 122 of the framework terminal and the message service DB 162 to perform the message hiding and restoring operation. For example, a third application may access an application programming interface ("API") of the changed framework, and therefore problems may be caused at the time of use.

If transmitting and receiving messages, the messages stored in the message service DB 162 of the framework terminal are archived as is, and the message control unit 120 stores a hiding message or attribute information identifying the hiding message in a separate local DB 160 provided within the application. The message control unit 120 may store both the hiding message and the attribute information concerning the hiding message.

If receiving a message hiding input signal from a user, the message control unit 120 may call a call processing API operation and requests a message list from the call processing unit 122. The call processing unit 122 may search for the message list from the message service DB 162 and return the searched message list to the message control unit 120.

The message control unit 120 may access the local DB 160 which is generated asynchronously from the above-described process to obtain a hiding message list. The hiding message list obtained from the local DB 160 and the message list returned from the message service DB 162 may be compared, and if a message coinciding with the hiding message of the local DB 160 is present in the message service DB 162, the corresponding message may be hidden on the screen.

If receiving the message hiding input signal with respect to a message from the user, the message control unit 120 may store at least one of the hiding message and the attribute information concerning the hiding message in the local DB 160. If data of the local DB 160 is updated, the local DB 160 transmits a hiding request message to the message control unit 120. The message control unit 120 may receive the hiding request message to hide the message on the screen.

If receiving a message restoring input signal with respect to a message from a user, the message control unit 120 may search for the corresponding hiding message from the local DB 160 and restore the searched hiding message on the screen. The local DB 160 may transmit a restoring request message to the message control unit 120, and the message control unit 120 receives the restoring request message to restore the corresponding message on the screen. A message list may be searched from the message service DB 162 through the call processing unit 122. The hiding message of the local DB 160 and messages from the message list of the message service DB 162 may be compared, and the corresponding hiding message may be restored if the compared messages are the same based on the comparison result.

If the message restoring input signal with respect to a hiding message is received from a user, the message control unit 120 searches for the attribute information of the corresponding hiding message from the local DB 160. A message corresponding to the attribute information may be searched from the message list of the message service DB 162 through the call processing unit 122 using the attribute information of the hiding message, and when the corresponding message is searched, the searched message is restored on the screen. For example, the message may be tagged and stored, and later searched according to the tag. Further, the tag, the tagged message, and/or the message may be extracted and used for another application.

Figure 3:
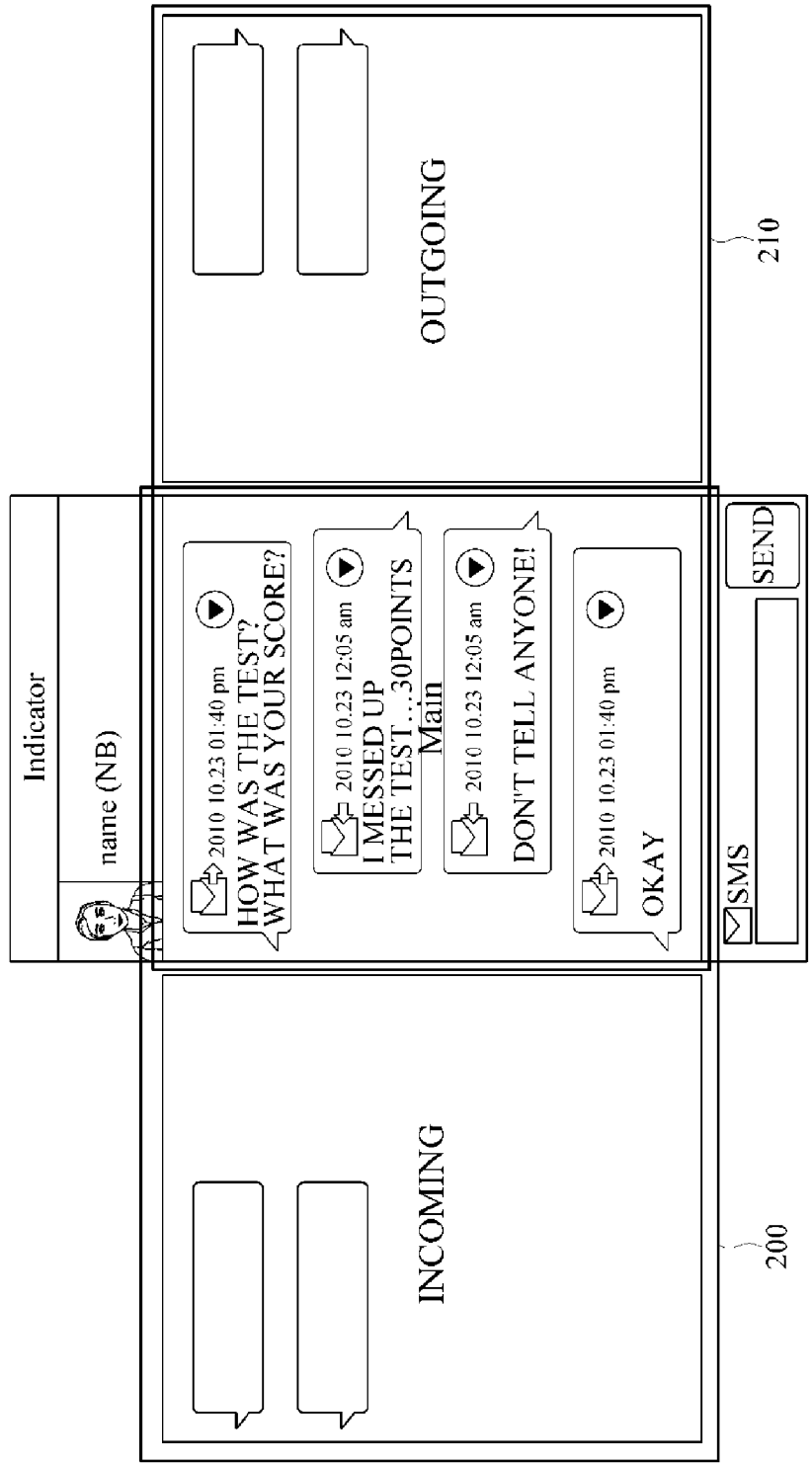
FIG. 3 is a diagram of a hide screen display according to an exemplary embodiment of the present invention.
Figure 4:
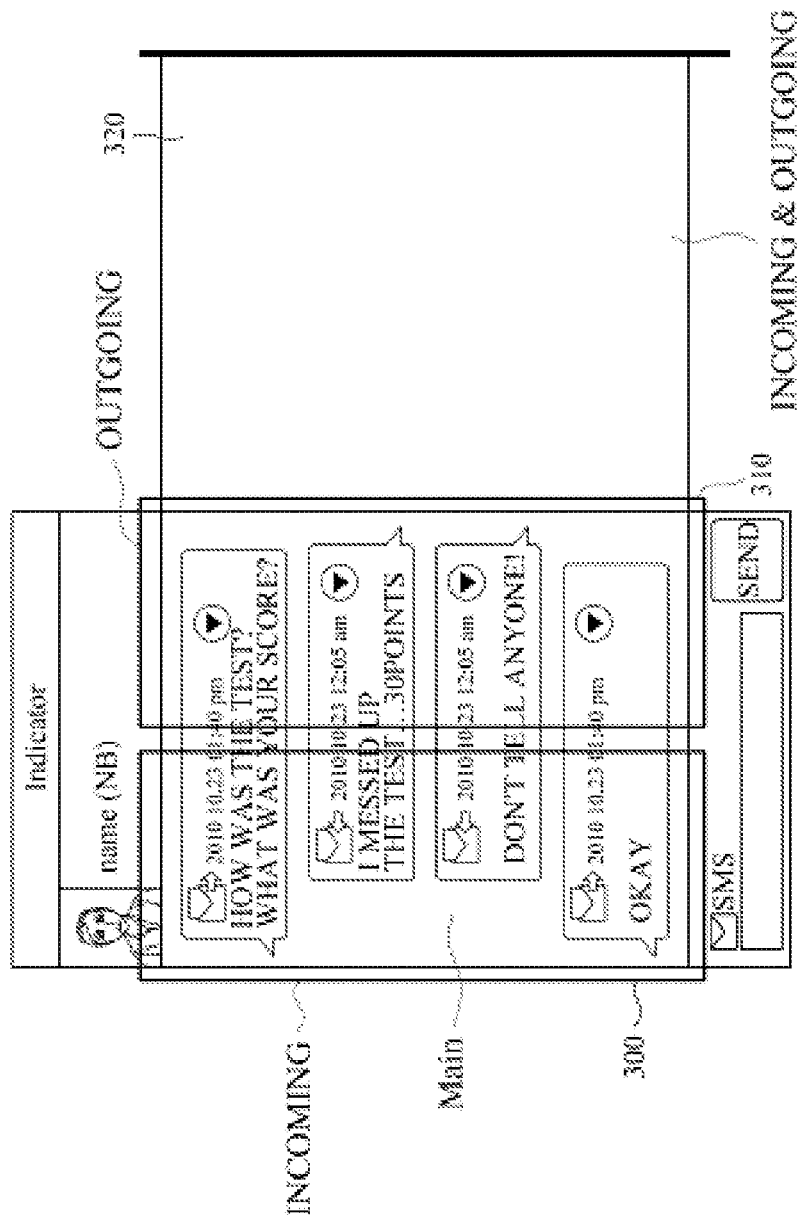
FIG. 4 is a diagram of a hide screen display according to an exemplary embodiment of the present invention.
Figure 5:
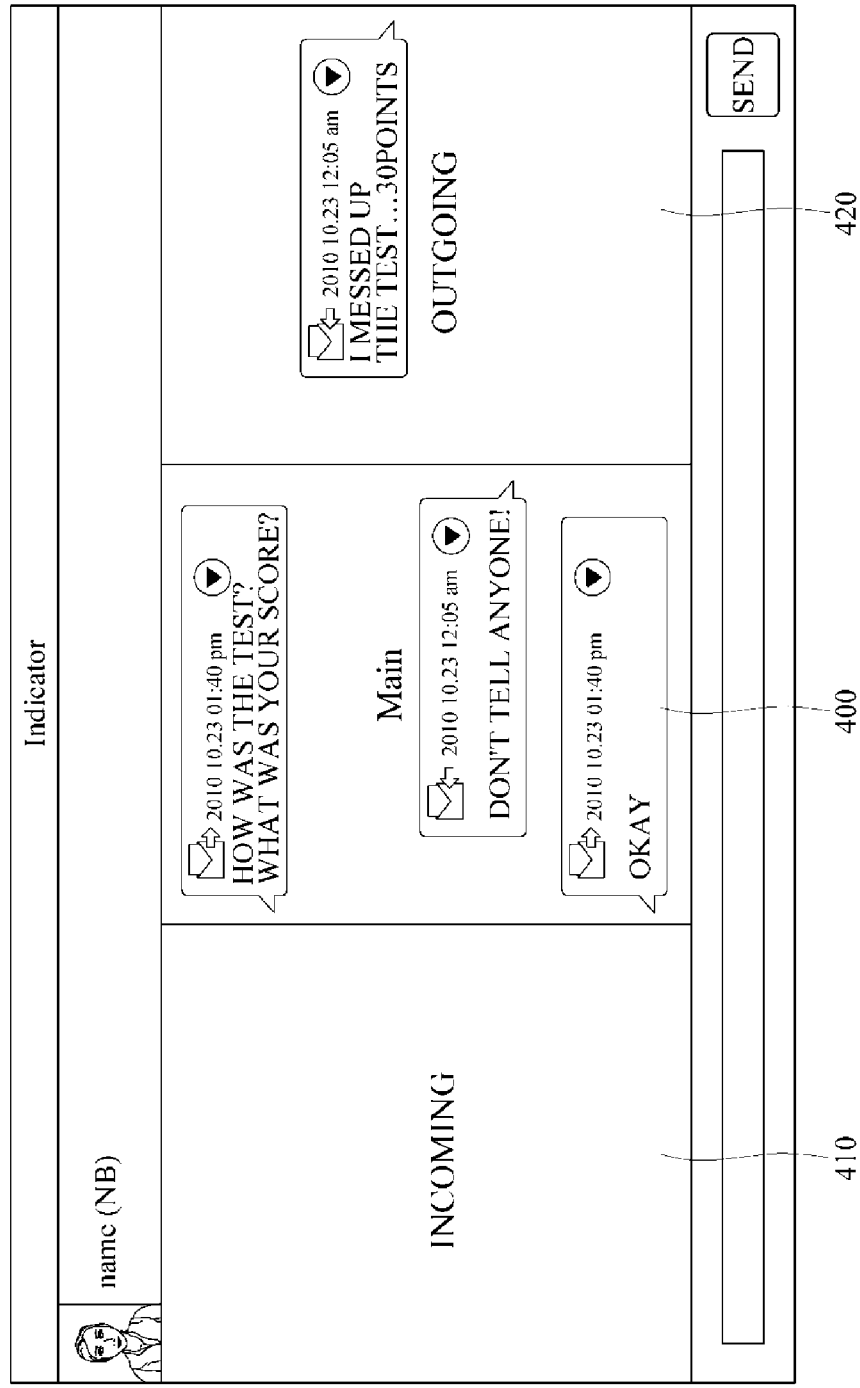
FIG. 5 is a diagram of a hide screen display according to an exemplary embodiment of the present invention.

FIG. 3 is a diagram of a hide screen display according to an exemplary embodiment of the present invention. FIG. 4 is a diagram of a hide screen display according to an exemplary embodiment of the present invention. FIG. 5 is a diagram of a hide screen display according to an exemplary embodiment of the present invention. Although FIG. 3, FIG. 4, and FIG. 5 will described as if generated by the terminal of FIG. 1, exemplary embodiments are not limited thereto.

The terminal 1 may display a main screen where an outgoing message and an incoming message are displayed, an outgoing hide screen where an outgoing message may be hidden, and an incoming hide screen where an incoming message may be hidden. The terminal 1 may display the outgoing hide screen on one side perpendicular to a direction in which messages are aligned in a row on the main screen and the incoming hide screen on the other side.

The terminal 1 may select a display screen based on specifications of a display of the terminal. The specifications of the display may include a screen size and a screen direction of the terminal 1.

For example, referring to FIG. 3, if a terminal screen is longer in a transverse direction, the number of pages displayed on a single screen may be 2. In other words, the main screen and the incoming hide screen may be displayed on a single screen, as shown in a screen 200, or the main screen and the outgoing hide screen may be displayed in a single screen, as shown in a screen 210. In other words, the single screen may be divided into two pages because a size of the screen is reduced if the terminal screen is longer in the transverse direction.

Referring to FIG. 4, an incoming message may be hidden on the left side of the screen on a hide screen corresponding to a main screen, as shown in a screen 300, and an outgoing message may be hidden on the right side, as shown in a screen 310. The hidden outgoing and incoming messages may be displayed outside the main screen as shown in a screen 320.

Referring to FIG. 5, the terminal 1 may display a main screen 400, an incoming hide screen 410, and an outgoing hide screen 420 on a single screen. This screen may corresponds to a terminal screen is longer in a transverse direction or to a terminal with a larger screen size, such as, a tablet PC, a notebook PC, a laptop, etc.

If the terminal 1 is longer in a transverse direction and the main screen and the hide screen are displayed together on the same screen, the ratio of a width of a message of the main screen may be applied in a longitudinal direction. This may compensate for a phenomenon in which a message is laterally elongated and becomes visually awkward if the terminal 1 is converted into a transverse screen.

If performing a pinch in operation on the main screen 400 by a user, the incoming hide screen 410 and the outgoing hide screen 420 may be displayed, and if performing pinch out operation, the screen returns to display the main screen 400.

Figure 6:
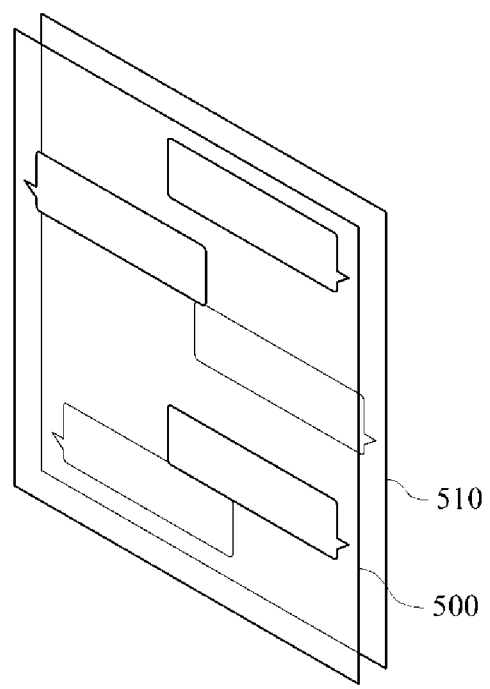
FIG. 6 is a diagram of a hide screen display according to an exemplary embodiment of the present invention.

FIG. 6 is a diagram of a hide screen display according to an exemplary embodiment of the present invention.

Referring to FIG. 6, the terminal 1 may display an outgoing hide screen and an incoming hide screen through a virtual view 510, separated from a view 500 of a main screen.

Multi-view refers a concept in which a user may be aware of messages displayed in different three-dimensional (3D) spaces. On a screen space horizontally and vertically corresponding to an original position of a hidden message, messages may be hidden. Displaying the hidden message using the multi-view may provide relative freedom from limitations on the size of the terminal screen.

Figure 7A:
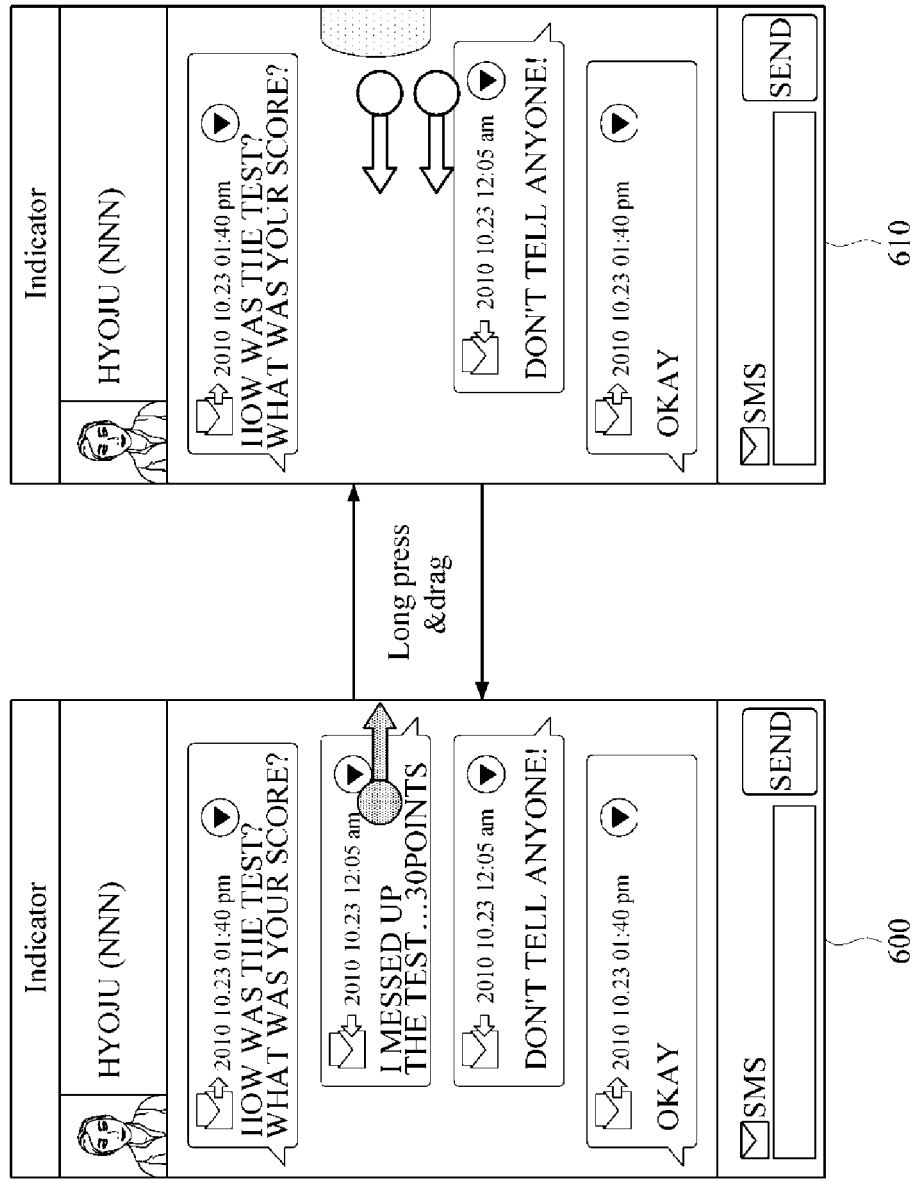
FIG. 7A is a diagram of a screen to hide a message or to restore the hidden message according to an exemplary embodiment of the present invention.
Figure 7B:
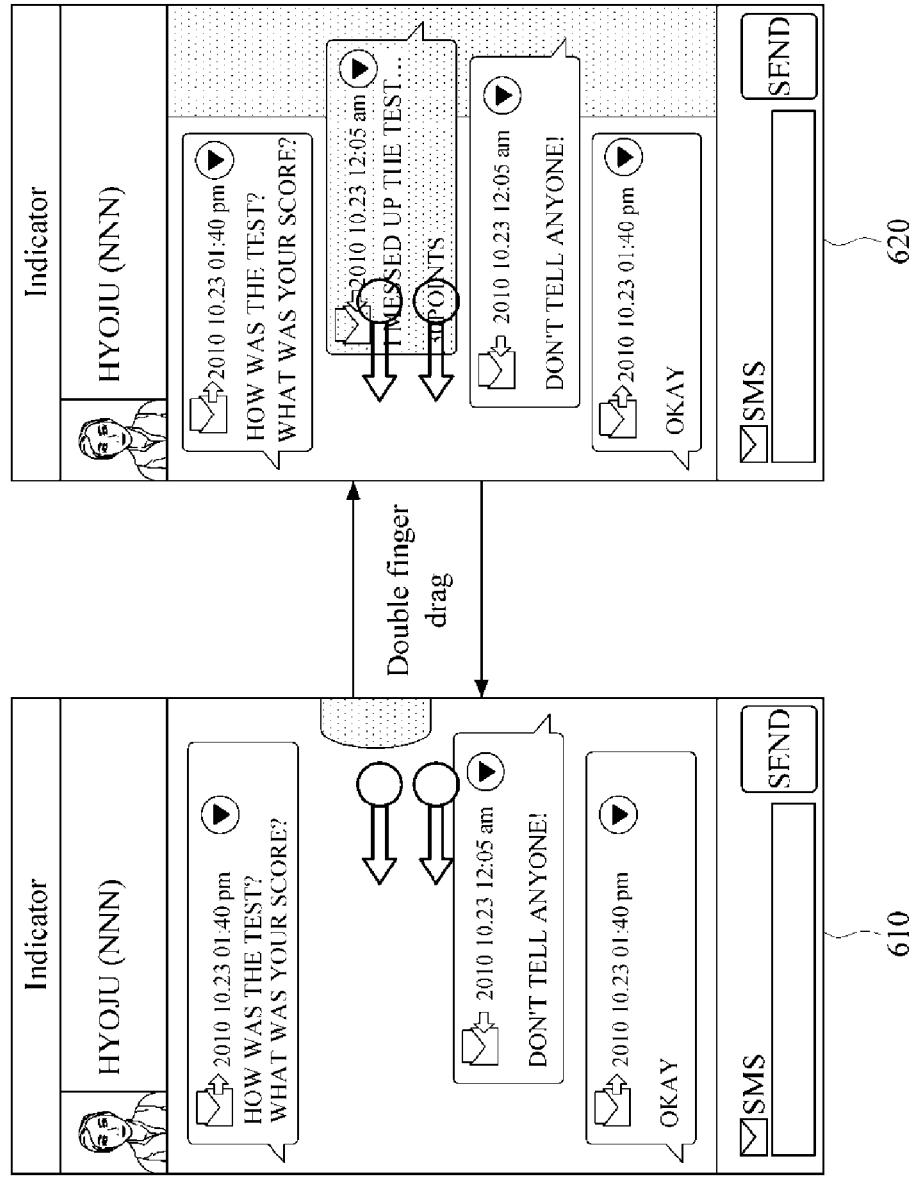
FIG. 7B is a diagram of a screen to hide a message or to restore the hidden message according to an exemplary embodiment of the present invention.

FIG. 7A is a diagram of a screen to hide a message or to restore the hidden message according to an exemplary embodiment of the present invention. FIG. 7B is a diagram of a screen to hide a message or to restore the hidden message according to an exemplary embodiment of the present invention. FIG. 7C is a diagram of a screen to hide a message or to restore the hidden message according to an exemplary embodiment of the present invention. FIG. 7D is a diagram of a screen to hide a message or to restore the hidden message according to an exemplary embodiment of the present invention. FIG. 7E is a diagram of a screen to hide a message or to restore the hidden message according to an exemplary embodiment of the present invention.

Referring to FIG. 7A, in a screen 600, a drag input may be performed with respect to a message positioned on a main screen by a user. The terminal 1 may hide the message in a corresponding dragging direction, as shown in a screen 610. A drag input signal may be a long press and drag operation, but is not limited thereto. If a drag input is performed with respect to the hidden message in the opposite direction by the user, as shown in the screen 610, the terminal 1 may display the hidden message on the main screen, as shown in the screen 600.

Referring to FIG. 7B, in a screen 610, a multi-touch drag input may be performed by a user on the screen where a message is hidden. The terminal 1 may display all hidden messages together with an output message and an incoming message on a main screen, as shown in a screen 620. A drag input signal may be a double finger drag operation, but is not limited thereto.

Referring to FIG. 7C, in a screen 620, a multi-touch drag input may be performed by a user in the same direction as the user input direction of FIG. 7B on a screen where an output message and an incoming message are displayed. The terminal 1 may provide a screen in which histories of hidden outgoing and incoming messages are displayed, as shown in a screen 630. A drag input signal may be a double finger drag operation, but is not limited thereto.

Referring to FIG. 7D, in a screen 640, a drag input may be performed with respect to a background of a main screen by a user. The terminal 1 may provide a screen in which histories of hidden outgoing and incoming messages are displayed, as shown in the screen 630. A drag input signal may be a long press and drag operation, but is not limited thereto.

Referring to FIG. 7E, in the screen 610 a multi-touch drag input may be performed by a user on a screen in which a message is hidden. The terminal 1 restores the hidden message on a main screen, as shown in a screen 650. A drag input signal may be a double finger drag operation.

The screens described with reference to FIG. 7A, FIG. 7B, FIG. 7C, FIG. 7D, and FIG. 7E are exemplary, and a variety of screen configurations according to a variety of user input signals may be implemented by those skilled in the related art.

Figure 8A:
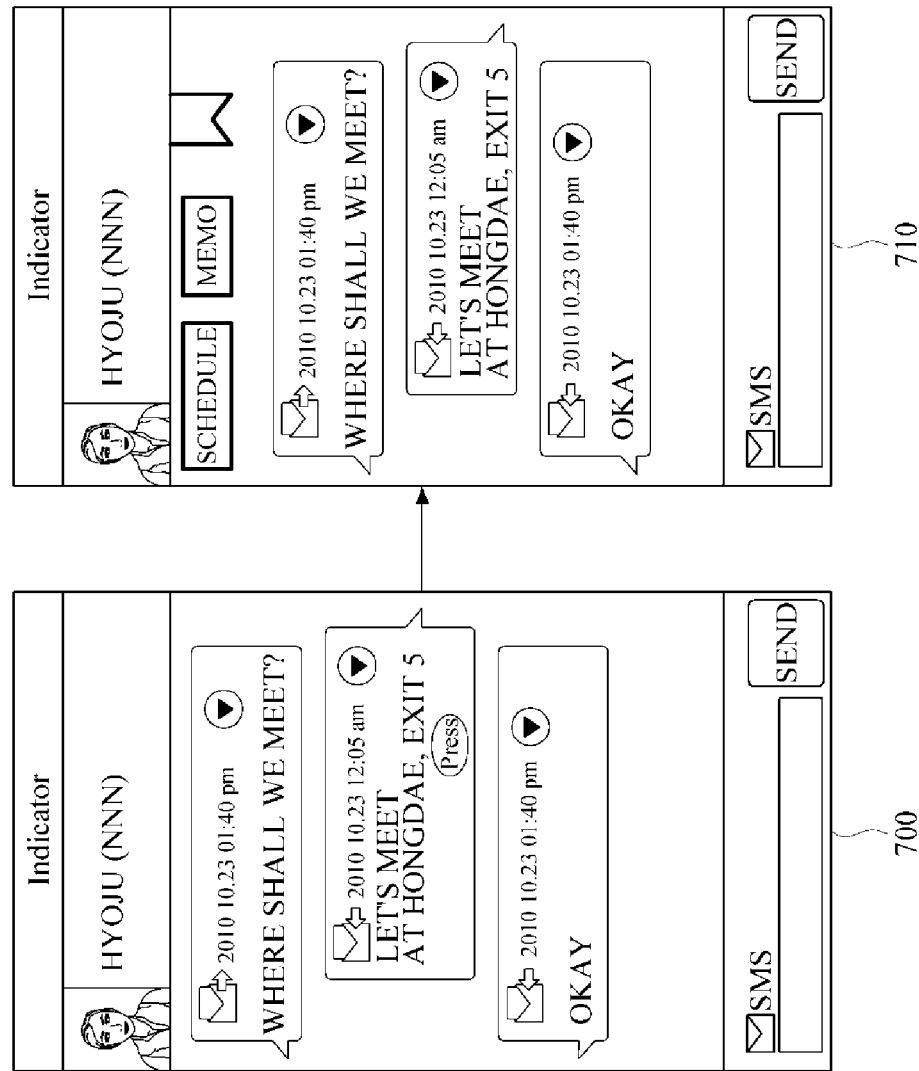
FIG. 8A is a diagram of a screen of a message hiding operation according to an exemplary embodiment of the present invention.
Figure 8B:
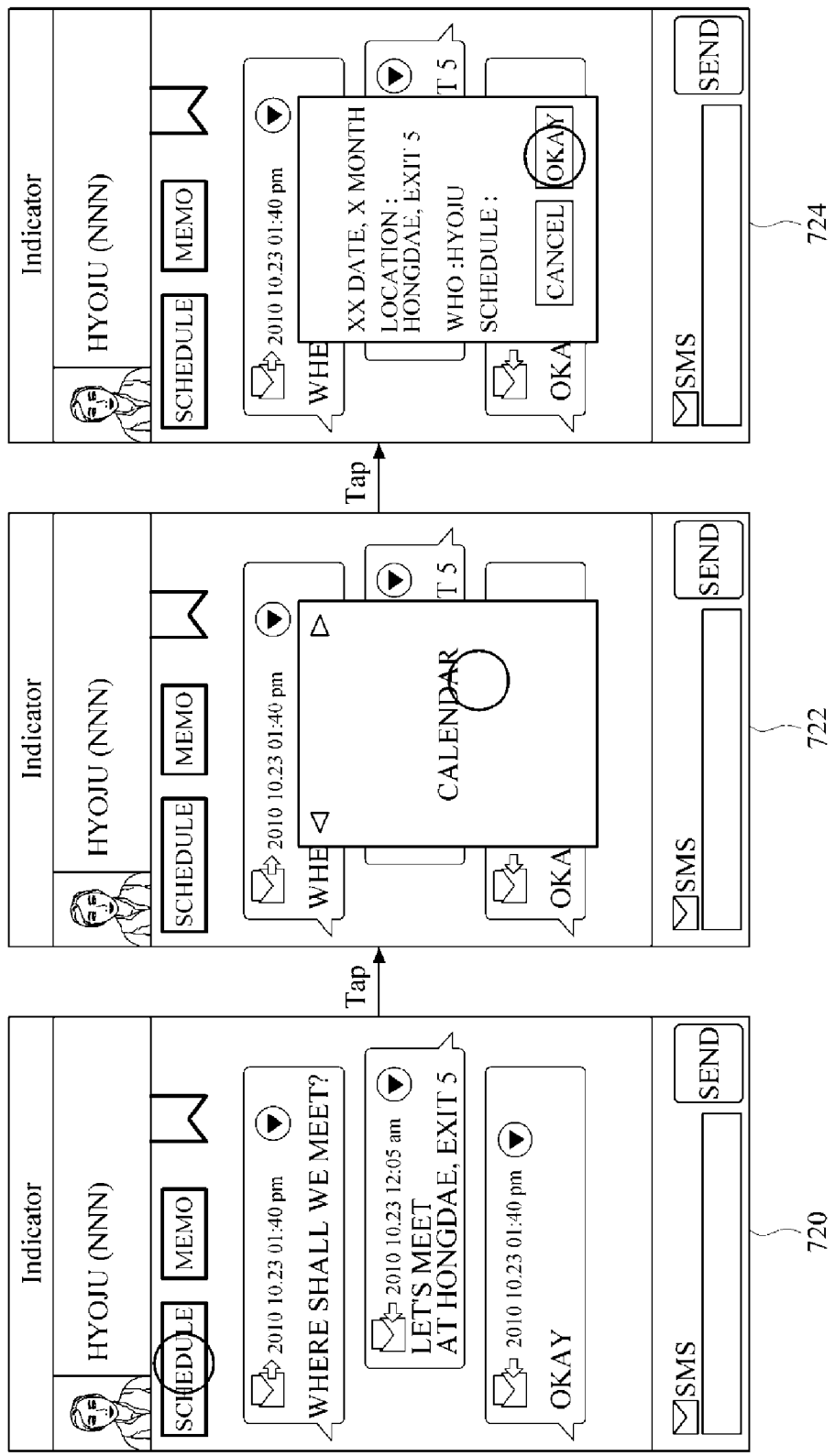
FIG. 8B is a diagram of a screen of a message hiding operation according to an exemplary embodiment of the present invention.
Figure 8E:
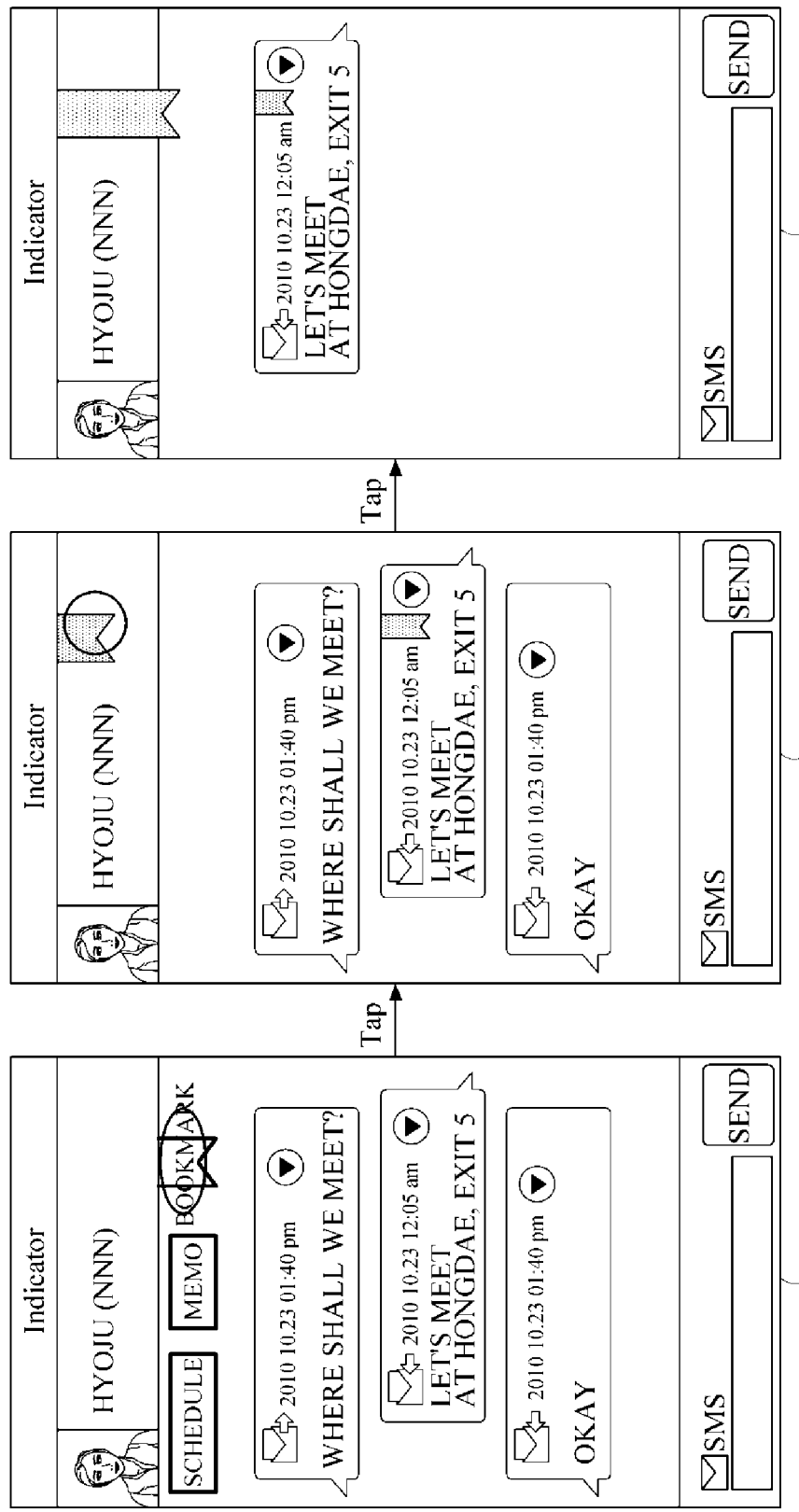
FIG. 8E is a diagram of a screen of a message hiding operation according to an exemplary embodiment of the present invention.

FIG. 8A is a diagram of a screen of a message hiding operation according to an exemplary embodiment of the present invention. FIG. 8B is a diagram of a screen of a message hiding operation according to an exemplary embodiment of the present invention. FIG. 8C is a diagram of a screen of a message hiding operation according to an exemplary embodiment of the present invention. FIG. 8D is a diagram of a screen of a message hiding operation according to an exemplary embodiment of the present invention. FIG. 8E is a diagram of a screen of a message hiding operation according to an exemplary embodiment of the present invention. Although FIG. 8A, FIG. 8B, FIG. 8C, FIG. 8D, and FIG. 8E will be described with reference to the features of FIG. 1, exemplary embodiments are not limited thereto.

Referring to FIG. 8A, in a screen 700, a reference input, for example, a press operation, may be performed with respect to a message by a user. A link may be formed with another application as a result of the reference input. The application may be schedule, a memo, or a bookmark, as shown in a screen 710.

FIG. 8B and FIG. 8C illustrate an example of linking with a schedule application. In a screen 720, a schedule application may be selected by a user. In a screen 722, a calendar may be displayed. In a screen 724, keywords related to a schedule may be extracted from a message. In a screen 726, the schedule may be recorded on the calendar.

An operation of recording specific schedule contents may be automatically performed by the terminal 1 or directly input by the user.

Although FIG. 8B and FIG. 8C illustrate message hiding linked with the schedule application, aspects of the present invention are not limited to the screens depicted in FIG. 8B and FIG. 8C.

FIG. 8D illustrates an example of linking with a memo application. In a screen 730, a memo application may be selected by a user. In a screen 732, a memo window may be displayed if a memo application operation is selected on the screen 730 by a user. If the user enters a memo, a memo is recorded, as shown in a screen 734. An operation of recording specific memo contents may be automatically performed by the terminal 1 or directly input by the user.

Although FIG. 8D illustrates message hiding linked with the memo application, aspects of the present invention are not limited to the screens depicted in FIG. 8D.

FIG. 8E illustrates an example of linking with a bookmark application. In a screen 740, a bookmark mode is entered when selecting a bookmark application operation on the screen 740 by a user, and a bookmark may be set with respect to a message by the user, as shown in a screen 742.

If setting at least one bookmark, a bookmark shape may be formed on an upper portion of the screen 742. A set bookmark may be verified, as shown in a screen 744, if selecting the bookmark shape by the user.

Although FIG. 8E illustrates message hiding linked with the bookmark application, aspects of the present invention are not limited to the screens depicted in FIG. 8D.

Figure 9A:
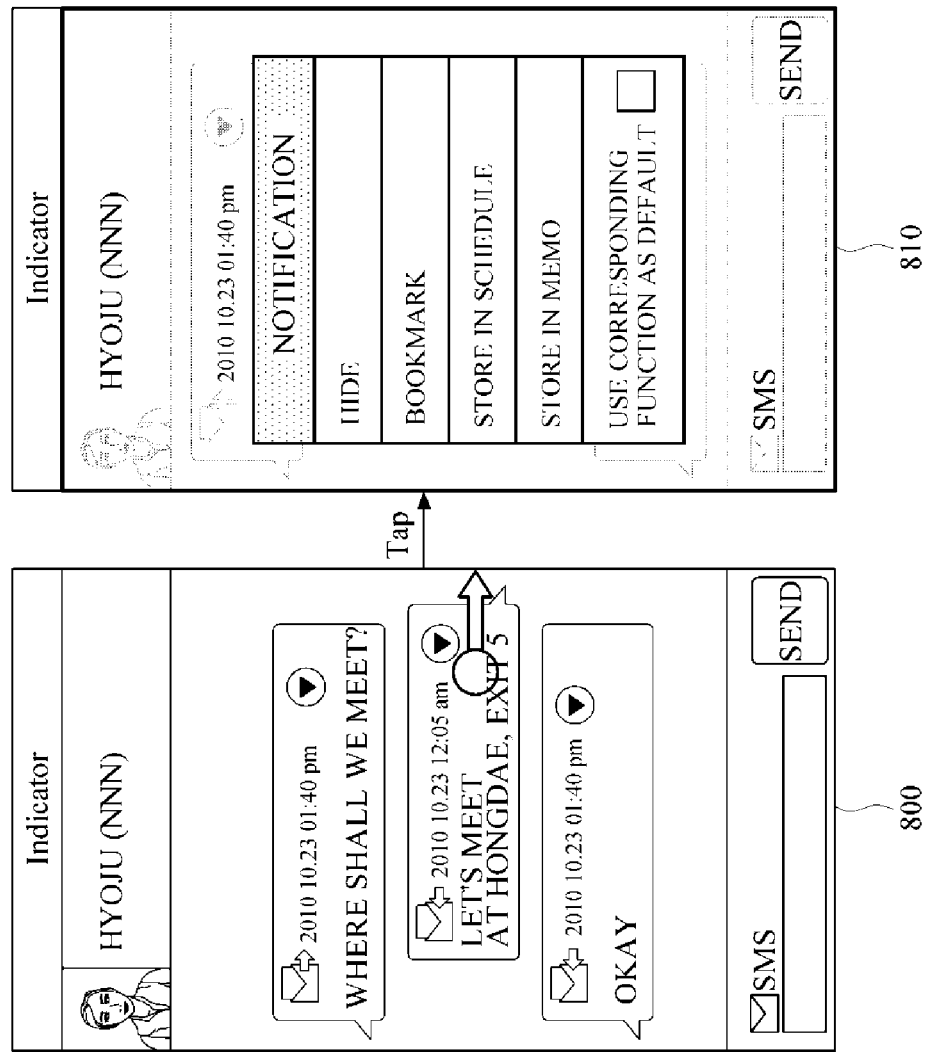
FIG. 9A is a diagram of a screen of a message hiding operation according to an exemplary embodiment of the present invention.
Figure 9C:
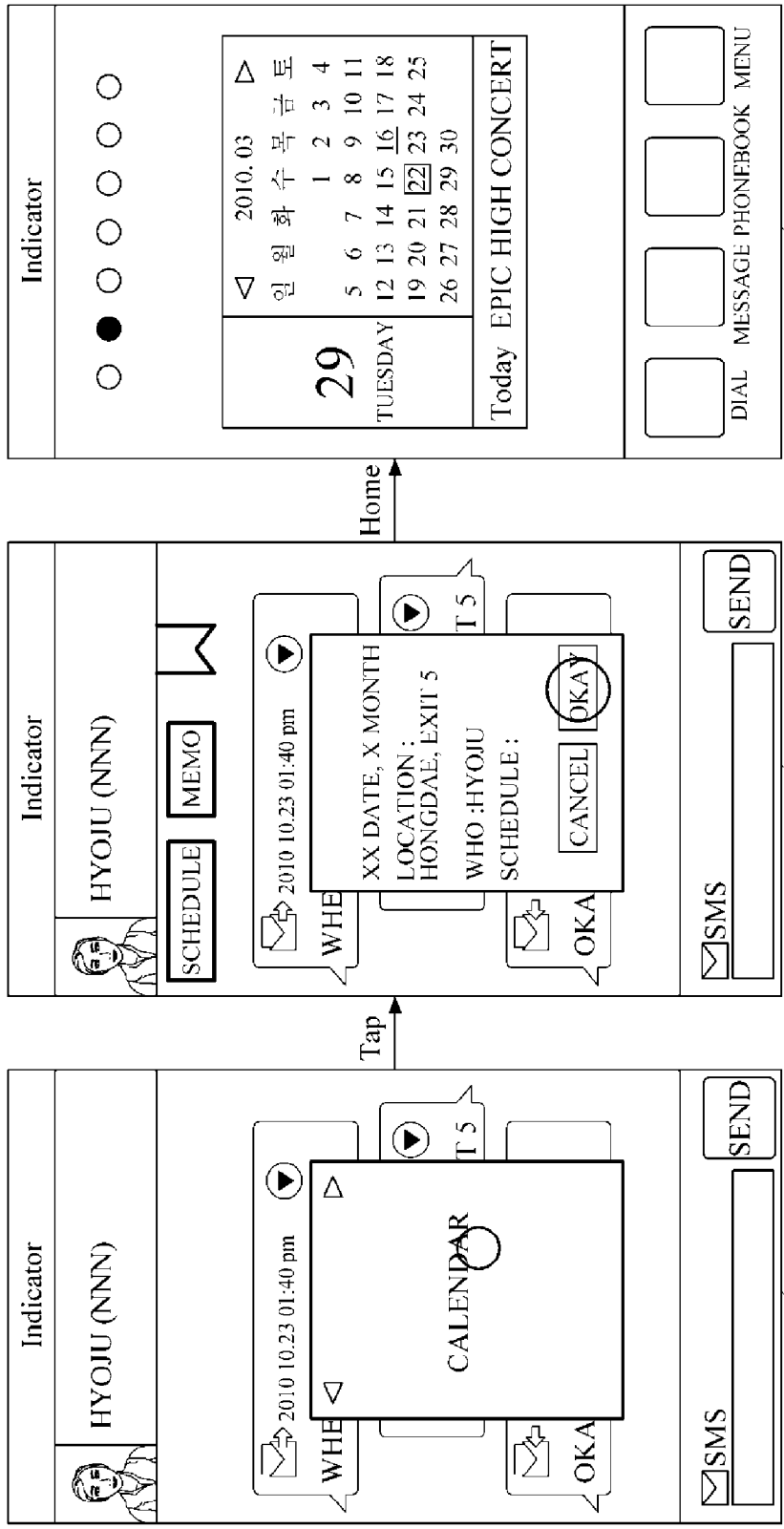
FIG. 9C is a diagram of a screen of a message hiding operation according to an exemplary embodiment of the present invention.
Figure 9D:
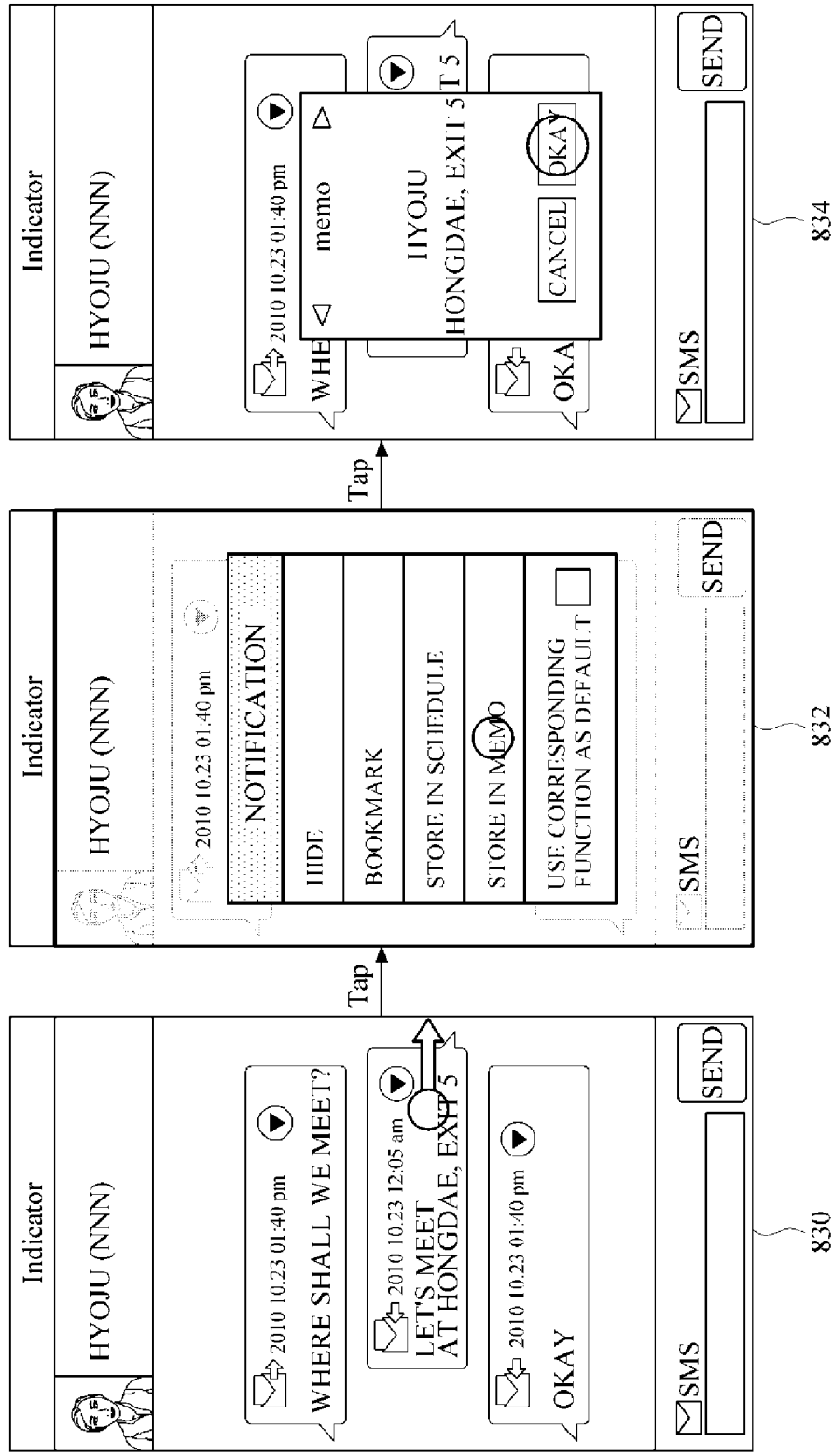
FIG. 9D is a diagram of a screen of a message hiding operation according to an exemplary embodiment of the present invention.
Figure 9E:
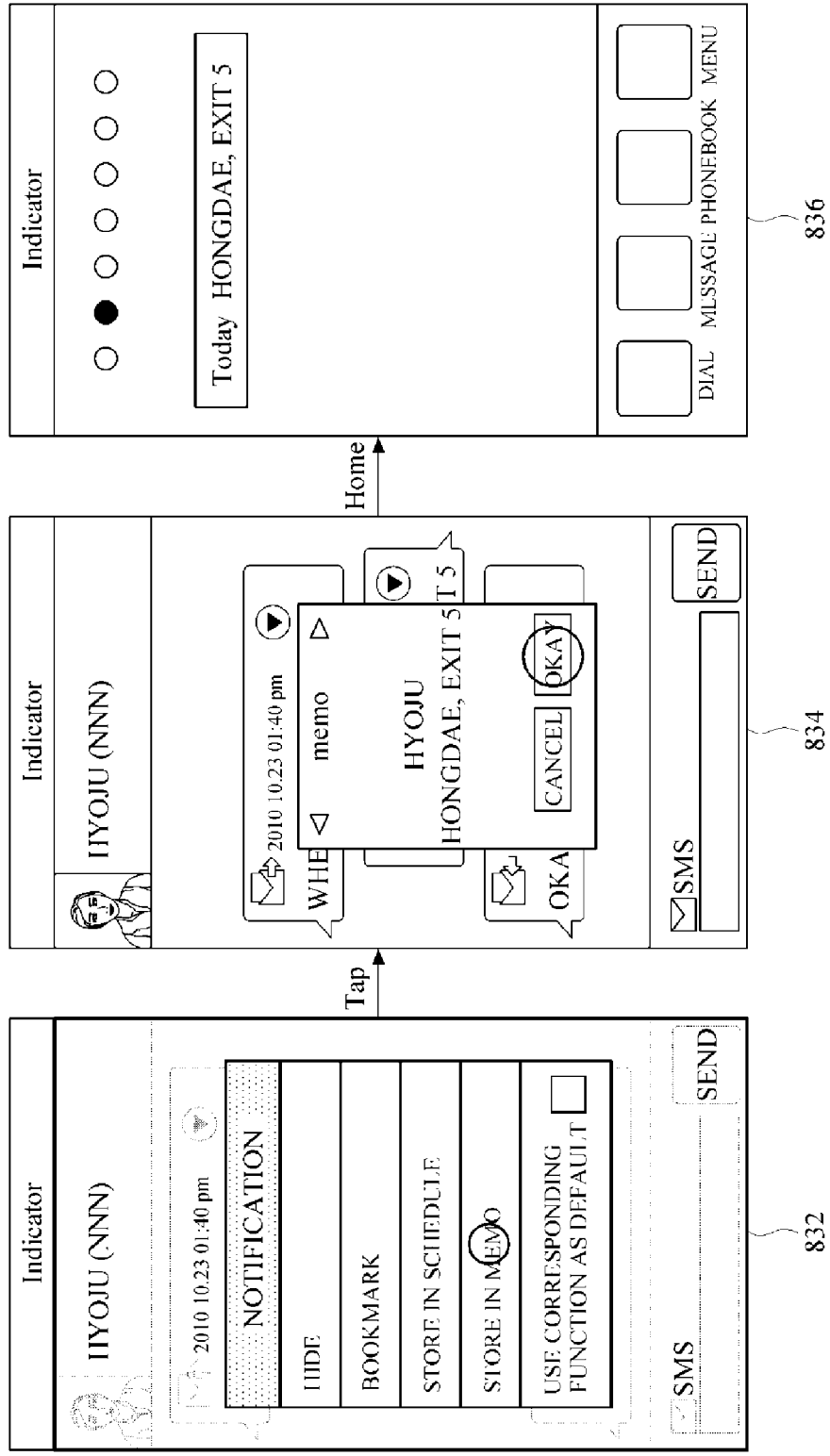
FIG. 9E is a diagram of a screen of a message hiding operation according to an exemplary embodiment of the present invention.
Figure 9F:
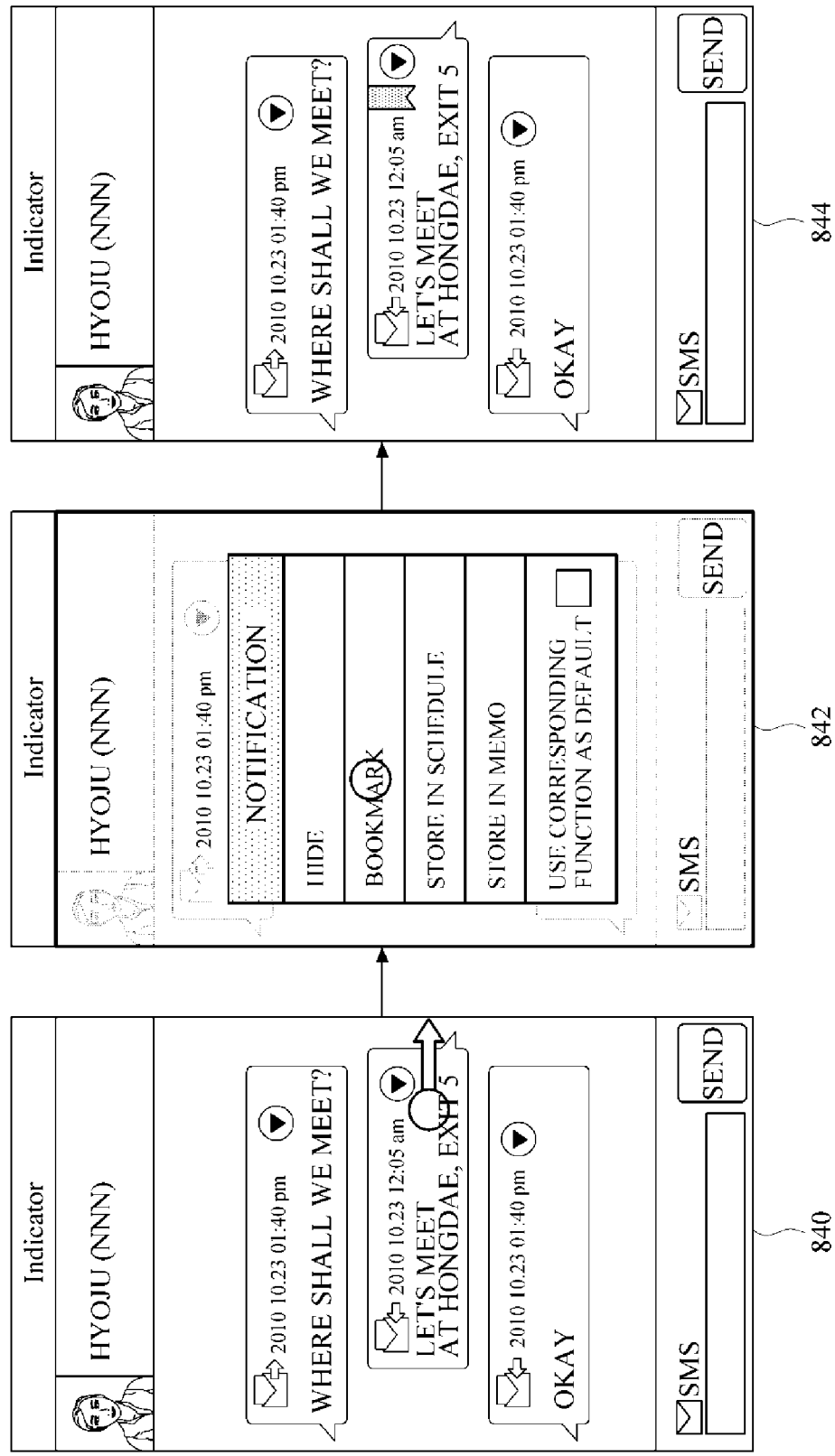
FIG. 9F is a diagram of a screen of a message hiding operation according to an exemplary embodiment of the present invention.

FIG. 9A is a diagram of a screen of a message hiding operation according to an exemplary embodiment of the present invention. FIG. 9B is a diagram of a screen of a message hiding operation according to an exemplary embodiment of the present invention. FIG. 9C is a diagram of a screen of a message hiding operation according to an exemplary embodiment of the present invention. FIG. 9D is a diagram of a screen of a message hiding operation according to an exemplary embodiment of the present invention. FIG. 9E is a diagram of a screen of a message hiding operation according to an exemplary embodiment of the present invention. FIG. 9F is a diagram of a screen of a message hiding operation according to an exemplary embodiment of the present invention. Although FIG. 9A, FIG. 9B, FIG. 9C, FIG. 9D, FIG. 9E, and FIG. 9F will be described with reference to the features of FIG. 1, exemplary embodiments are not limited thereto.

If the message hiding operation of the terminal 1 is linked with the other application, a variety of input signals may be used to operate the application. For example, a user input such as a long press, a double tap, or the like may be used. A pop-up method in which a selection window pops up on a screen of the terminal 1 may be used.

In FIG. 9A, a screen 800 illustrates a tap operation on a message which is linked with an application. The message hiding operation may be linked with an application using a specific user operation and a pop-up method. A pop-up screen may appear as shown in screen 810, if selecting a message from the screen 800 through a tap operation. The pop-up window may include menu items such as hiding, bookmark, storing in schedule, storing in memo, using corresponding operation as default, and the like. A default menu item may be provided in a checkbox format, and a corresponding operation instruction may be matched with a selected operation to be provided if a user checks the checkbox one time to perform the selected operation.

For example, if a user checks the checkbox of the default menu item to perform a hiding operation, a tap operation may be selected as a hiding operation. The default menu item may be changed, for example, in an environment setting.

Hereinafter, a message hiding operation being linked with a schedule application using the specific user operation and pop-up method will be described.

Referring to FIG. 9B and FIG. 9C, if selecting a message through a tap operation on a screen 820 by a user, a pop-up window appears, as shown in a screen 822. If selecting the schedule application operation by the user, a calendar 824 is displayed on a screen. Keywords related to the schedule are extracted from the message, as shown in a screen 826, and schedule contents are recorded on the calendar 824, as shown in a screen 828.

Referring to FIG. 9D and FIG. 9E, if selecting a message through a tap operation on a screen 830, a pop-up window appears, as shown in a screen 832. A memo window is displayed in a screen 834 if selecting a memo application operation in the screen 832. Memo contents are recorded if the user enters them, as shown in a screen 836.

Referring to FIG. 9F, a message is selected through a tap operation on a screen 840. If selecting a bookmark application operation on a screen 842, a bookmark mode is entered, and a bookmark with respect to the message may be set, as shown in a screen 844.

Figure 10A:
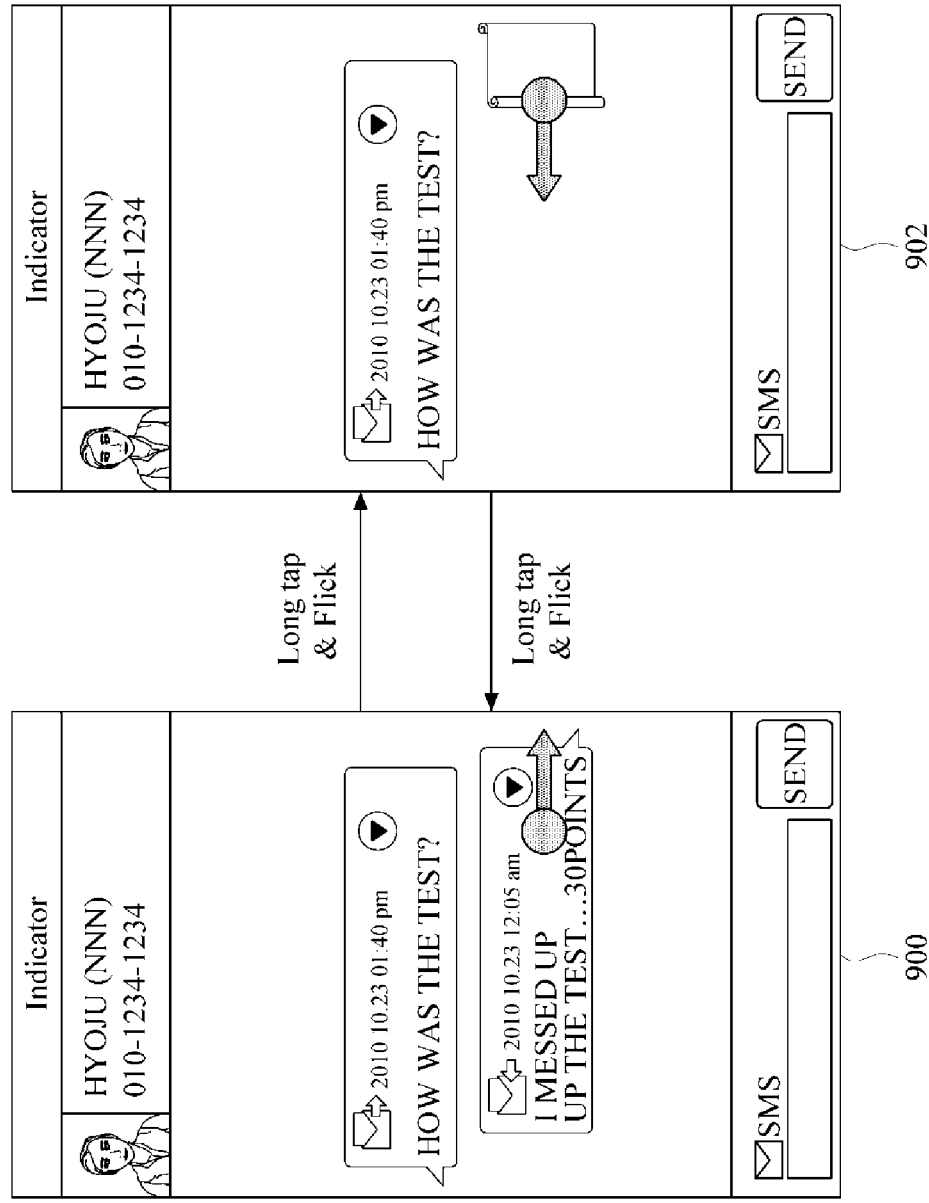
FIG. 10A is a diagram illustrating a screen to hide a message or restore a hidden message according to an exemplary embodiment of the present invention.
Figure 10C:
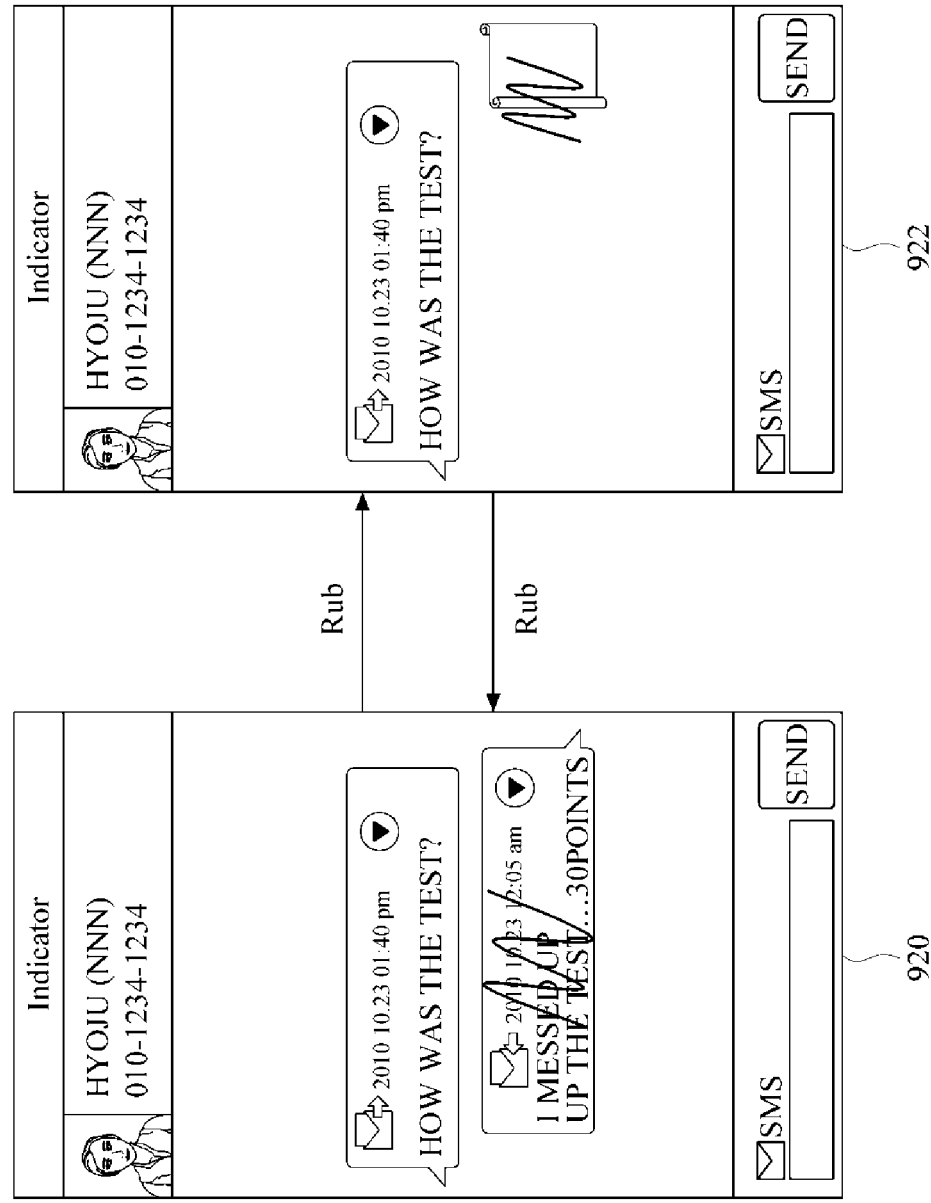
FIG. 10C is a diagram of a screen to hide a message or restore a hidden message according to an exemplary embodiment of the present invention.

FIG. 10A is a diagram of a screen to hide a message or restore a hidden message according to an exemplary embodiment of the present invention. FIG. 10B is a diagram of a screen to hide a message or restore a hidden message according to an exemplary embodiment of the present invention. FIG. 10C is a diagram of a screen to hide a message or restore a hidden message according to an exemplary embodiment of the present invention.

A user may hide a message or restore a hidden message through an operation such as a drag method, a double tap method, a rubbing method, or the like.

FIG. 10A illustrates an example in which the drag method is used, FIG. 10B illustrate an example in which the double tap method is used, and FIG. 10C illustrates an example in which the rubbing method is used.

Referring to FIG. 10A, a user input signal for hiding a message or restoring a hidden message may be received via the drag method. For example, as shown in a screen 900, if performing a drag operation with respect to a message on a main screen in a direction, a corresponding message may be hidden, as shown in a screen 902.

In contrast, if performing the drag operation in the opposite direction on the screen 902 where the message is hidden, the hidden message may be restored, as shown in the screen 900. The drag operation may be a long tap and flick operation.

Referring to FIG. 10B, a user input signal for hiding a message or restoring a hidden message may be received via the double tap method. For example, as shown in a screen 910, if performing the double tap operation with respect to a message on a main screen, a corresponding message may be hidden, as shown in a screen 912. In contrast, if the double tap operation is performed on the screen 912 where the message is hidden, the hidden message may be restored, as shown in the screen 910.

Referring to FIG. 10C, a user input signal for hiding a message or restoring a hidden message may be received via the rubbing method. For example, if performing the rubbing operation with respect to a message on a main screen, as shown in a screen 920, a corresponding message may be hidden, as shown in a screen 922. In contrast, if performing the rubbing operation on the screen 922 where the message is hidden, the hidden message may be restored, as shown in the screen 920.

Figure 10D:
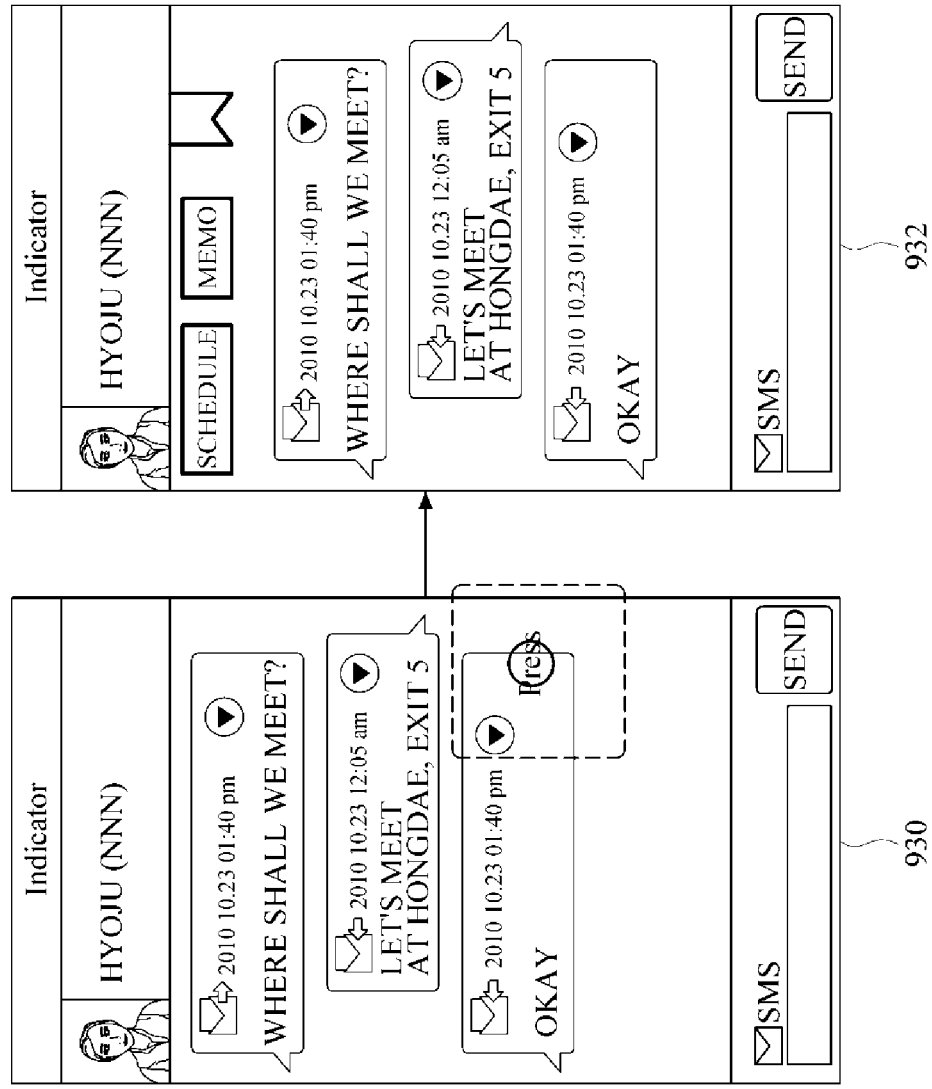
FIG. 10D is a diagram of a screen o to link a hidden message according to an exemplary embodiment of the present invention.

FIG. 10D is a diagram of a screen to link a hidden message according to an exemplary embodiment of the present invention.

FIG. 10 illustrates linking a hidden message with another application. Referring to FIG. 10D, if selecting a message, a screen 930 may be converted into a screen 932 which may be linked with applications such as schedule, memo, bookmark, and the like.

Figure 11A:
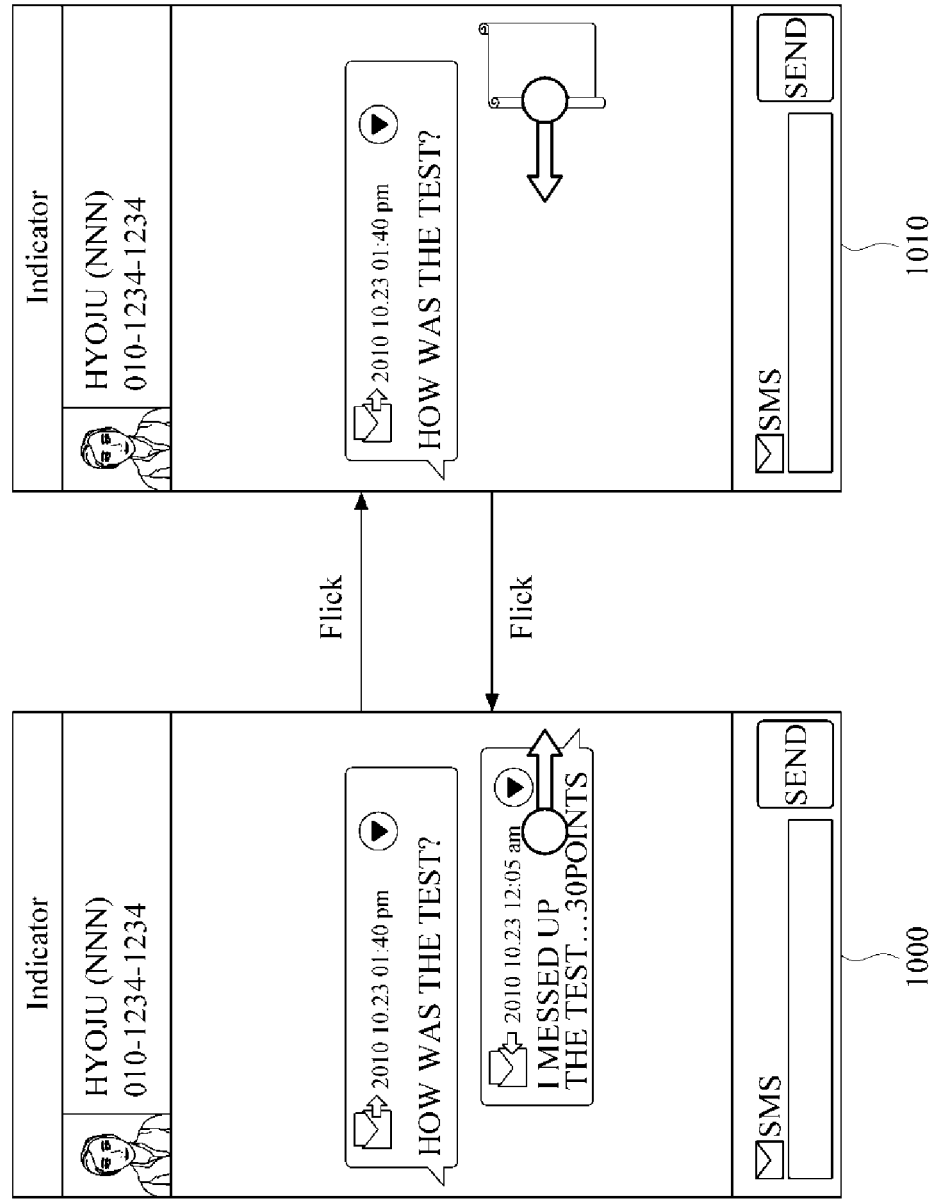
FIG. 11A is a diagram of a screen of a message hiding operation according to an exemplary embodiment of the present invention.
Figure 11B:
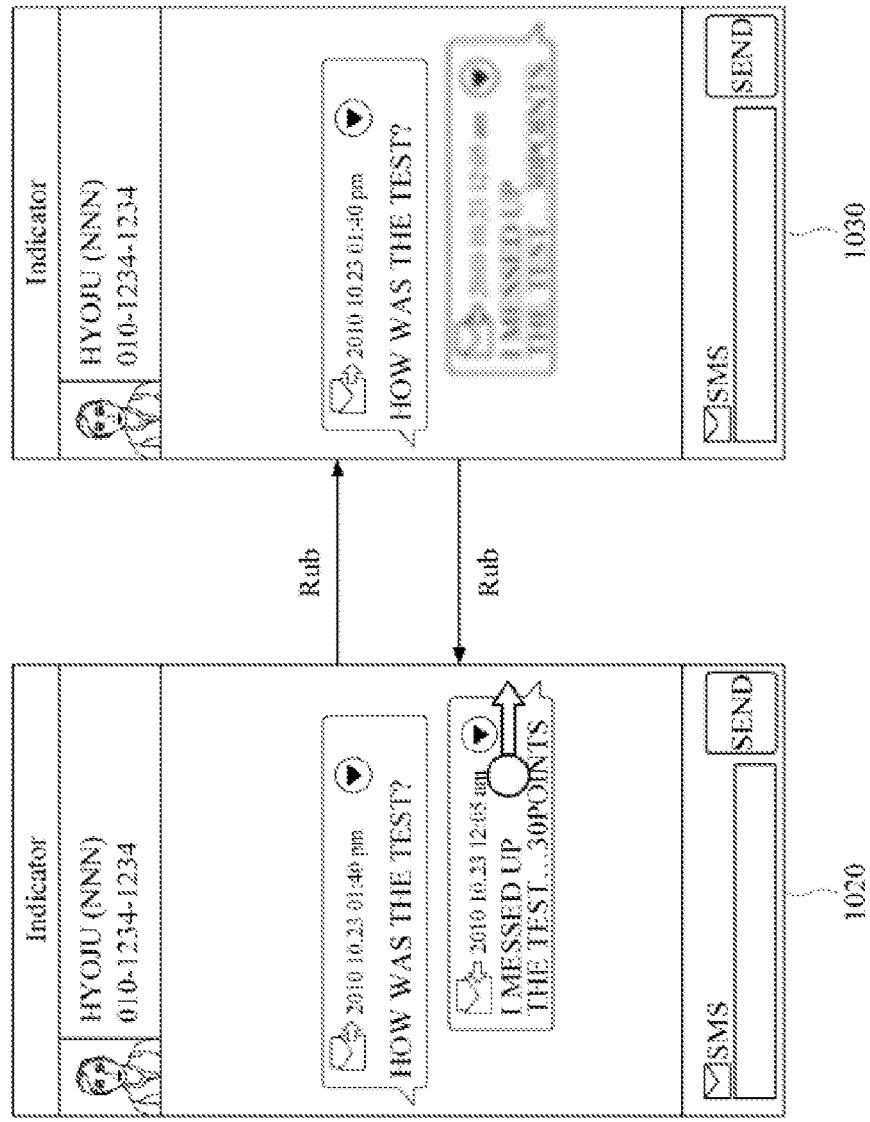
FIG. 11B is diagram of a screen of a message hiding operation according to an exemplary embodiment of the present invention.

FIG. 11A is a diagram of a screen of a message hiding operation according to an exemplary embodiment of the present invention. FIG. 11B is diagram of a screen of a message hiding operation according to an exemplary embodiments of the present invention. Although FIG. 11A and FIG. 11B will be described with reference to the features of FIG. 1, exemplary embodiments are not limited thereto.

Referring to FIG. 11A, if a user performs a reference operation, for example, a flick operation, with respect to a message to be hidden, as shown in a screen 1000, the terminal 1 displays a bookmark for identifying an origin of the hidden message while hiding a corresponding message, as shown in a screen 1010.

Referring to FIG. 11B, if a user performs a reference operation, for example, a rubbing operation, with respect to a message to be hidden, as shown in a screen 1020, the terminal 1 hides a corresponding message in a semi-transparent manner, as shown in a screen 1030.

Although FIG. 11A and FIG. 11B illustrate message hiding, aspects of the present invention are not limited to the screens depicted in FIG. 11A and FIG. 11B.

Figure 12A:
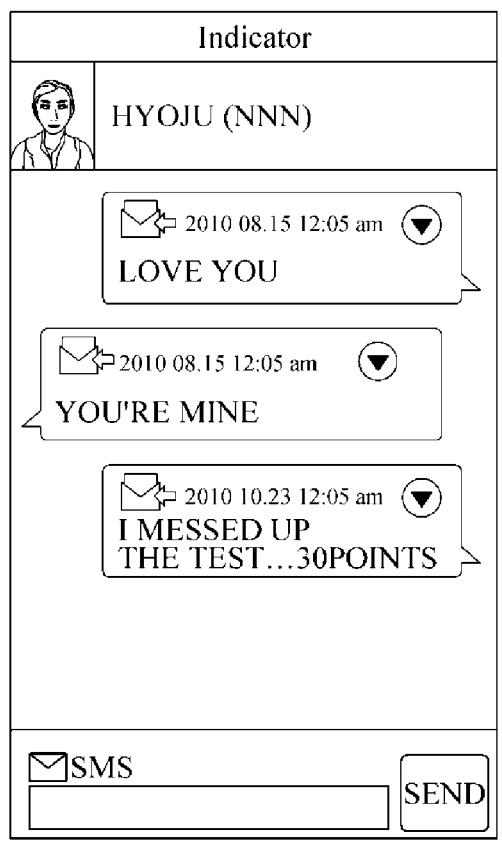
FIG. 12A is a diagram of an outgoing/incoming hide screen according to an exemplary embodiment of the present invention.

FIG. 12A is a diagram of an outgoing/incoming hide screen according to an exemplary embodiment of the present invention.

Figure 12B:
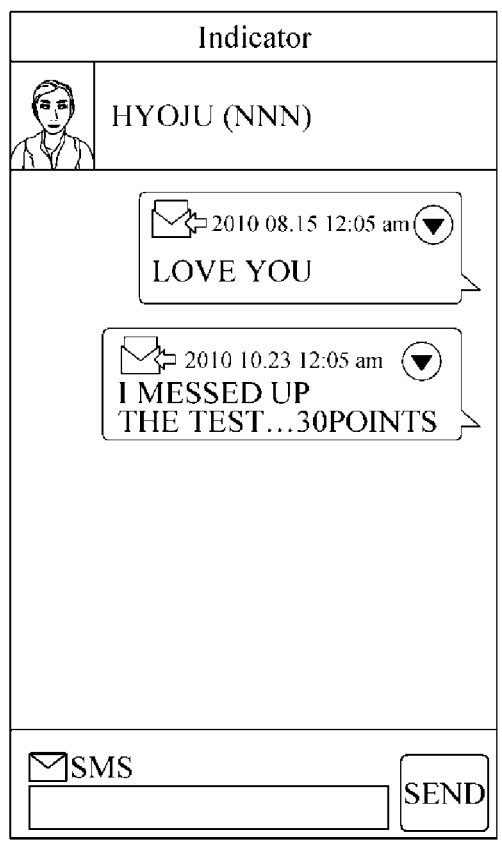
FIG. 12B is a diagram of an outgoing/incoming hide screen according to an exemplary embodiment of the present invention.

Referring to FIG. 12A, histories of two hidden outgoing message and a hidden incoming message may be displayed in a single window. In contrast, referring to FIG. 12B, the history of the two hidden outgoing message may be displayed on a single screen.

Figure 13:
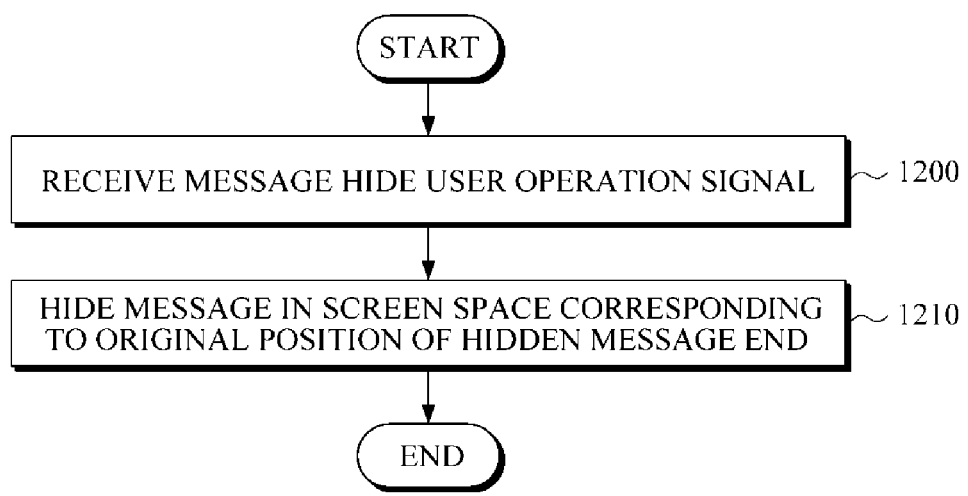
FIG. 13 is a flowchart of a method for hiding a message according to an exemplary embodiment of the present invention.

FIG. 13 is a flowchart of a method for hiding a message according to an exemplary embodiment of the present invention. Although FIG. 13 will be described with reference to the features of FIG. 1, exemplary embodiments are not limited thereto.

In operation 1200, the terminal 1 receives a user input signal to hide a message displayed on a screen.

In operation 1210, the terminal 1 hides a message on a reference screen space in accordance with the user input signal. The terminal 1 may set the message as in a hidden state, and hide the message in a screen space corresponding to an original position of the hidden message to identify an origin of the hidden message.

In operation 1210, the terminal 1 may hide the message for each conversation partner with respect to messages provided in the form of speech bubbles.

According to aspects of the exemplary embodiments, in operation 1210, the terminal 1 may display an outgoing hide screen on one side of a main screen perpendicular to a direction in which messages are aligned in a row on the main screen, and an incoming hide screen on the other side. The message may be hidden in a screen space horizontally corresponding to the original position of the hidden message.

According to aspects of the exemplary embodiments, in operation 1210, the terminal 1 may display the outgoing hide screen and the incoming hide screen through a virtual view, separately from the main screen. The message may be hidden in a screen space horizontally and vertically corresponding to the original position of the hidden message.

According to aspects of the exemplary embodiments, the terminal 1 may provide an additional operation in conjunction with another application with respect to the hidden message. The application may be a schedule application, a memo application, a bookmark application, etc.

According to exemplary embodiments, if a user protects messages in a terminal, user convenience and user data protection may be increased.

If a user of the terminal 1 opens a message window to view conversation contents, the privacy of the user may be protected by hiding a message.

According to aspects of the exemplary embodiments, a user may verify in which position a message is hidden within a message window which may increase ease of use.

According to aspects of the exemplary embodiments, a message may be hidden for each conversation partner, such that a user may verify which conversation partners' messages are hidden within the message window.

According to aspects of the exemplary embodiments, a hide target may be messages or may be replaced with or expanded to all types of data which the user can hide in the terminal 1 for information protection.

For example, the hide target may be phonebook data, call list data, schedule management data, or memo data.

According to aspects of the exemplary embodiments, the messages may include character messages, multimedia messages, or multimedia contents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal to hide a message, comprising:
   a touch screen display to display a main screen comprising messages associated with a determined user, the messages comprising a sent message transmitted from the terminal to the determined user and a received message received from the determined user to the terminal, the sent message being configured to be displayed at a first side of the main screen and the received message being configured to be displayed at a second side of the main screen;
   a touch panel of the touch screen display to receive a first input signal and a second input signal;
   a controller configured to hide at least one message from the main screen in response to the first input signal and to restore the at least one message to the main screen in response to the second input signal,
   wherein the sent message is configured to be hidden in a direction associated with the first side, and the received message is configured to be hidden in a direction associated with the second side,
   wherein a selected message is hidden in a separate screen not visible on the main screen of the display, and
   wherein the separate screen is configured to display a hidden received message and a hidden sent message such that the hidden received message and the hidden sent message are displayed in a form distinguishing the hidden received message from the hidden sent message for a user.

2. The terminal of claim 1, further comprising:
   a message database to store a selected message if the first input signal is received with respect to the selected message.

3. The terminal of claim 2, wherein the message database stores attribute information of the selected message and the attribute information is provided to an application of the terminal, the application being associated with a message application displaying the main screen and configured to process information of the selected message.

4. The terminal of claim 1, wherein the separate screen comprises an incoming hide screen and an outgoing hide screen, the incoming hide screen being associated with a hidden received message, the outgoing hide screen being associated with a hidden sent message.

5. The terminal of claim 1, wherein the separate screen is disposed on a side perpendicular to a direction in which the messages are displayed.

6. The terminal of claim 1, wherein the at least one message is hidden in a virtual screen of the display.

7. The terminal of claim 1, wherein the at least one message is hidden according to the determined user.

8. The terminal of claim 1, wherein a hidden message is displayed in a semi-transparent manner.

9. A method executed by a terminal for hiding a message, comprising:
   displaying, on a display, a main screen comprising messages associated with a determined user, the messages comprising a sent message transmitted from the terminal to the determined user and a received message received from the determined user to the terminal, the sent message being configured to be displayed at a first side of the main screen and the received message being configured to be displayed at a second side of the main screen;
   receiving a first input to select at least one message on the main screen;
   moving the selected message from the main screen to a hidden screen in response to the first input; and
   restoring the hidden message to the main screen if a second input is received,
   wherein the sent message is configured to be hidden in a direction associated with the first side, and the received message is configured to be hidden in a direction associated with the second side,
   wherein the selected message is hidden in a separate screen not visible on the main screen of the display, and
   wherein the separate screen is configured to display a hidden received message and a hidden sent message such that the hidden received message and the hidden sent message are displayed in a form distinguishing the hidden received message from the hidden sent message for a user.

10. The method of claim 9, wherein the hidden screen is a separate screen space not visible on the main screen.

11. The method of claim 10, wherein the hidden screen is disposed on a side perpendicular to a direction in which the messages are displayed.

12. The method of claim 9, wherein the hidden screen is a virtual screen.

13. The method of claim 9, wherein the hidden message is displayed on the hidden screen, as the hidden screen is retrieved on the display, according to the determined user.

14. The method of claim 9, further comprising:
   linking the hidden message with an application of the terminal, the application being associated with a message application displaying the main screen and configured to process information of the selected message.

15. The method of claim 14, wherein the application is at least one of a memo application, a schedule application, and a bookmark application.

16. A method of hiding and restoring an object, comprising:
- displaying, on a display, a main screen comprising messages associated with a determined user, the messages comprising a sent message transmitted from the terminal to the determined user and a received message received from the determined user to the terminal, the sent message being configured to be displayed at a first side of the main screen and the received message being configured to be displayed at a second side of the main screen;
- receiving an input selecting an object displayed on the main screen; and
- hiding the selected object in response to the input, and restoring an object from a separate screen in response to another input,
- wherein the selected object is hidden in the separate screen not visible on the main screen of the display, and
- wherein the separate screen is configured to display a hidden received message and a hidden sent message such that the hidden received message and the hidden sent message are displayed in a form distinguishing the hidden received message from the hidden sent message for a user.

17. The method of claim 16, wherein the object is at least one of a message, a memo application, a schedule application, and a bookmark application.

* * * * *